United States Patent [19]
Mifune et al.

[11] Patent Number: 5,408,987
[45] Date of Patent: Apr. 25, 1995

[54] PORTABLE HEATER

[75] Inventors: Hideo Mifune; Tomio Nitta; Masato Seki; Shinichi Okawa; Yosimitu Kaga; Noriyuki Serizawa; Tatsuya Tashiro; Tsutomu Inada, all of Shizuoka, Japan

[73] Assignee: Tokai Corporation, Kanagawa, Japan

[21] Appl. No.: 129,184

[22] PCT Filed: Feb. 10, 1993

[86] PCT No.: PCT/JP93/00168
§ 371 Date: Feb. 7, 1994
§ 102(e) Date: Feb. 7, 1994

[87] PCT Pub. No.: WO93/15975
PCT Pub. Date: Aug. 19, 1993

[30] Foreign Application Priority Data

| Feb. 12, 1992 | [JP] | Japan | 4-025402 |
| Mar. 27, 1992 | [JP] | Japan | 4-070866 |
| Aug. 6, 1992 | [JP] | Japan | 4-231345 |
| Oct. 2, 1992 | [JP] | Japan | 4-264655 |
| Oct. 14, 1992 | [JP] | Japan | 4-275861 |
| Oct. 26, 1992 | [JP] | Japan | 4-287295 |
| Nov. 12, 1992 | [JP] | Japan | 4-302178 |
| Feb. 4, 1993 | [JP] | Japan | 5-017198 |

[51] Int. Cl.$^6$ .............................................. A47G 23/04
[52] U.S. Cl. ............................ 126/262; 126/263 R; 126/368; 126/11
[58] Field of Search .............. 126/263, 262, 368, 261, 126/265, 38, 11

[56] References Cited

U.S. PATENT DOCUMENTS

| 3,566,857 | 3/1971 | Price . | |
| 3,804,076 | 4/1974 | Fant et al. . | |
| 5,020,509 | 6/1991 | Suzuki et al. | 126/263 |
| 5,186,619 | 2/1993 | Mifune et al. | 431/344 |
| 5,299,556 | 4/1994 | Ando | 126/262 X |

FOREIGN PATENT DOCUMENTS

| 0052580 | 5/1982 | European Pat. Off. . |
| 894311 | 10/1953 | Germany . |
| 509468 | 10/1986 | Germany . |
| 53-19812 | 5/1978 | Japan . |
| 54-38314 | 11/1979 | Japan . |
| 55-63880 | 1/1980 | Japan . |
| 55-025757 | 2/1980 | Japan . |
| 56-153473 | 11/1981 | Japan . |
| 57-87534 | 6/1982 | Japan . |
| 60-34357 | 2/1985 | Japan . |
| 1-131445 | 9/1989 | Japan . |
| 2-13904 | 1/1990 | Japan . |
| 3-113210 | 5/1991 | Japan . |
| 4-214121 | 4/1992 | Japan . |
| 92939 | 2/1922 | Switzerland . |
| 474990 | 7/1969 | Switzerland . |
| 2213742 | 8/1989 | United Kingdom . |

OTHER PUBLICATIONS

JPO International Search Report dated Apr. 27, 1993 in Application No. PCT/JP93/00168.

Primary Examiner—Larry Jones
Attorney, Agent, or Firm—Brumbaugh, Graves, Donohue & Raymond

[57] ABSTRACT

A portable heater is made up of a cylindrical outer case 2 with at least one end thereof opened; a container to be heated 6 fixedly housed in the outer case 2 with a gap between the container and said outer case for the updraft of a combustion gas, the container being made of a cylindrical heat resisting container body 6c having a top 6b provided with an opening tab 6a; a burner 3 which is equipped with an ignition means 8, and is fixedly housed in the outer case 2 at a lower inside thereof so as to heat the container 6; and a fuel tank 4 fixed in a lower inside of the outer case 2 for supplying fuel to the burner 3. The container 6 holds contents to be heated when the heater is in use, and the outer case 2 has vent holes for supplying air from the outside to the burner 3. Thereby, contents of the container can be heated at any desired time and place without drawing the contents of the container by opening the top of the container. Also, the heater is provided with a heating means having a superior combustion efficiency which enables beverages to be directly heated at any desired place.

21 Claims, 20 Drawing Sheets

F I G. 11
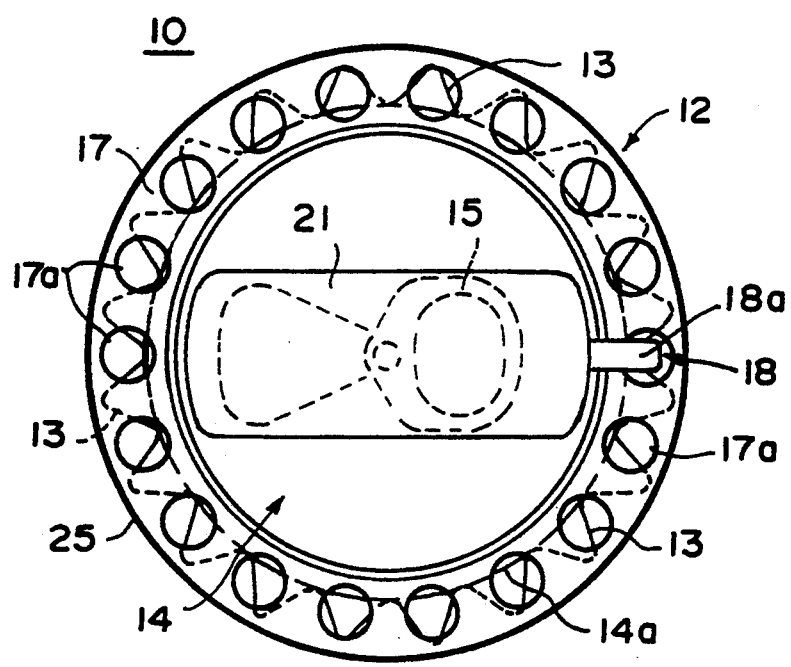
F I G. 12
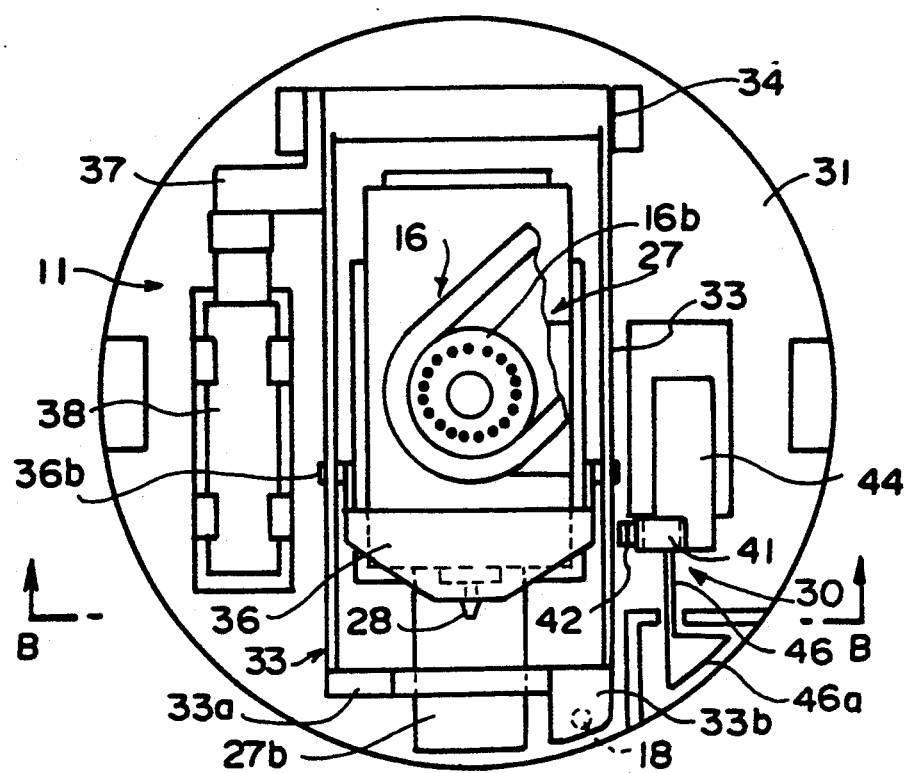

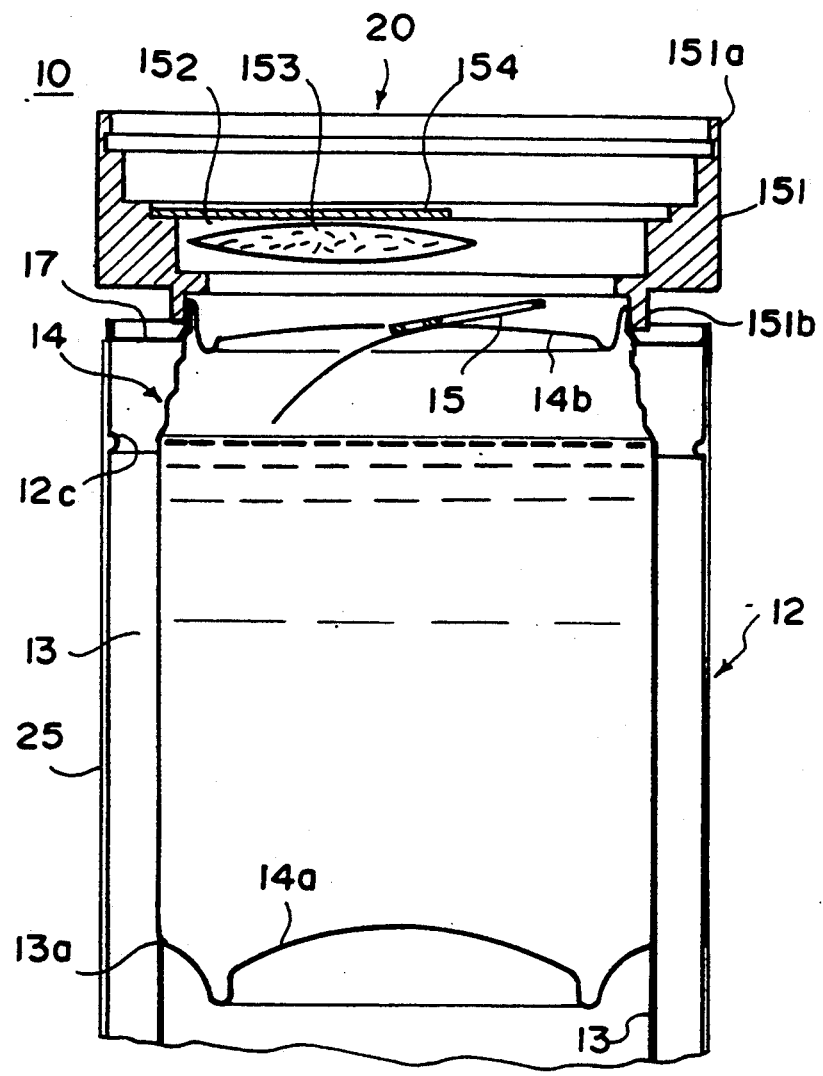

PORTABLE HEATER

TECHNICAL FIELD

This invention relates to a portable heater such as a can having a burner, and more particularly to a heater equipped with a container to be heated for holding contents and a burner for heating the container.

The contents of the container or the can may include not only food items to be cooked by various heating methods, such as boiling, frying, and steaming, and beverages which are better drunk when warm but also steamed towels or syringe needles, which are boiled before use, or items such as a hot-water bottle which is used when warmed. Thus, the contents of the container may comprise items which are used for eating, drinking or any other purposes by heating.

BACKGROUND ART

Cans are generally used for perishables. Before the contents of the can are cooked by heating, the can is opened so that the contents can be withdrawn therefrom. Some canned beverages are dispensed by a vending machine which keeps the cans warm, but they will eventually be cooled if they are not drunk immediately. Hence, it is necessary for hikers or climbers to separately bring portable fuel in order to heat or warm any canned foods or canned beverages which they have brought with them.

Although heaters such as portable fuel and portable cookers are widely known, it is troublesome to carry these heaters along with food, and also laborious to cook the food with such a cooker.

To simplify the cooking of food, various instant meals which only require the pouring of hot water are also known, but the above-described heaters are still necessary in order to obtain the hot water in the first place, when cooking such instant meals outdoors.

In a portable heater, a container to be heated is mounted on a support metal fixture provided on a burner, or is inserted into the support metal fixture so that it can be engageably supported. However, this type of support structure encounters a problem that the heated container may fall from the support when the heater is moved.

Meanwhile, there is a demand for a lightweight compact portable heater possessing the necessary strength to hold a burner, a container to be heated, a fuel tank, and the like.

When a heater is operated, the heater must utilize a limited amount of fuel gas as efficiently as possible, and hence the heater should be superior in operability and functionality.

Also, when a combustion duct is provided to direct a combustion gas so that a heat efficiency of the heater can be improved, it becomes difficult to handle this duct when it is heated.

In order to improve a combustion efficiency, it is necessary to take air for combustion purposes into the heater. However, the combustion of the heater may be obstructed by a backfire, that is, a spurt of flames out from an opening, the flames produced by the ignition of gas filled inside the heater, or by inflow of wind from outside.

In the case of a heater equipped with a burner at the bottom end thereof, the heater suffers several drawbacks in its ignition operations.

On the other hand, the supply of gas from a fuel tank is affected by a latent heat of the gas when it evaporates, so that the supply becomes unstable. The supply of gas also becomes unstable due to atmospheric temperature, and hence the heater experiences unstable combustion.

In view of the foregoing descriptions and observations, an object of this invention is to provide a portable heater which can easily cook canned food anywhere directly without opening the can before the contents of a container are heated; which can directly heat a canned beverage anywhere; and which is compact and lightweight, and has sufficient strength, and provides a stable combustion with a high heat efficiency and a superior operability.

DISCLOSURE OF THE INVENTION

To solve the foregoing drawbacks, this invention provides a portable heater comprising: a cylindrical outer case with at least one end thereof open; a container to be heated, for containing contents to be heated when the heater is in use, fixedly housed in the outer case with a gap between the container and the outer case for the updraft of a combustion gas, the container being made of a cylindrical heat resisting container body having a top provided with an opening tab; a burner which is equipped with an ignition means, and is fixedly housed in the outer case at a lower inside thereof so as to heat the container; a fuel tank fixed at a lower inside of the outer case; and vent holes formed on the outer case for supplying air from the outside to the burner.

In this arrangement, contents of the container can be heated at any desired time and place by igniting the burner, and hence it is possible to realize a convenient portable heater. The existence of a gap between the container and the outer case for the updraft of a combustion gas leads to highly efficient combustion of the burner and effective use of heating fuel.

In the portable heater according to the present invention, the outer case should preferably be made of a metal laminate. A heat insulating material is provided on at least the interior surface of the outer case, and a heat insulating expanded member is provided on the exterior surface of this outer case if necessary.

With this arrangement, hot air produced by the combustion of the burner heats the heat insulating member, but only a nominal amount of heat is transferred because of the heat insulating characteristics of the insulating member. Also, heat stored in the heat insulating member is gradually transferred to the metal laminate, and a temperature gradient of this metal laminate becomes smaller by an increase of heat dispersion of the metal laminate resulting from heat transfer, thereby suppressing an increase of temperature of the exterior surface. The insulating member having a large capacity for heat build-up leads to an increased thermal efficiency during heating, and also acts as a lagging material for suppressing a drop in temperature after heating is terminated. The use of the heat insulating expanded member disposed over the exterior of the outer case brings about a further drop in temperature of the exterior surface, which makes handling of the outer case much easier.

It will be convenient to cover the top of the outer case with a vessel for holding the contents of the container after the heater is heated, for example, dishes used to eat foods. The ignition means of the burner should preferably be made up of a piezoelectric type automatic ignition device.

The portable heater, according to this invention, should preferably be provided with a means for automatically boring a discharge hole in a main body of the container for expelling steam in order to prevent explosion when a pressure or a temperature inside the main body of the container exceeds a predetermined level by heating the contents of the container.

In the portable heater according to this invention, at least a part of the fuel tank should preferably be made of a transparent material so that the quantity of remaining fuel is visible from the outside, and a window is formed at a location on the outer case corresponding to the transparent part of the fuel tank so that the remaining fuel can be checked.

More preferably, first vent holes are formed at a location on the outer case which is lower than the burner, and a second vent port is formed at a location on the outer case which is higher than the burner, whereby air for combustion purposes is supplied. It is desirable that a baffle plate with small holes be provided to the inside of the second vent port, and this baffle plate be formed by separating the upper and lower sides of the second vent port and convexly pressing the separated leaf into the outer case when the second vent port is opened by pressing the outer case.

This arrangement allows sufficient air necessary for combustion to flow into the outer case through the first vent holes and second vent port. If large flames are temporarily produced by igniting a large amount of emitted gas, the presence of the baffle plate prevents the flames from spurting out from the outer case. This baffle plate also obstructs flow of wind, water, dusts, or the like into the outer case, thereby providing stable combustion. Further, the presence of the baffle plate leads to an improved strength. Integral formation of the baffle plate by pressing facilitates its production.

Meanwhile, one end of a heat transfer metal plate is wrapped around the outer periphery of the fuel tank in the heater, and the other end of the same remains in contact with the bottom of the burner.

With this heat transfer plate, transfer of heat from the burner to the fuel tank through the heat transfer plate suppresses a temperature drop in the fuel tank resulting from the cooling of the fuel tank due to a latent heat of the gas when fuel gas that has flowed out of the fuel tank evaporates, thereby preventing a drop in flow rate of the gas and, hence, providing a stable flow rate of gas over a long combustion period.

A gas flow channel is divided into two streams: namely, a main stream passing through the center of a nail-shaped stationary part, and a sub-stream passing through a disk-like filter from its outer periphery to its center hole which surrounds the stationary part. The filter includes open cells which constitute the gas flow channel and closed cells which cause expansion or contraction in accordance with temperature variations, so that the gas flow channel expands or contracts. The filter should preferably be composed of a microporous filter for automatically regulating a gas flow rate.

With this arrangement, variations in gas flow rate resulting from changes in gas pressure within the fuel tank in accordance with an ambient temperature are reduced by regulating a part of the gas flow rate through the microporous filter in accordance with temperature. If the whole of the gas flow rate is supplied through the microporous filter, the microporous filter will be cooled by a latent heat of the gas when it evaporates, whereby the above mentioned result may not be yielded. However, this is avoided by dividing the gas flow channel into two streams: namely, the main stream flowing through the center of the nail-shaped stationary part, and the sub-stream.

A partition member is interposed between the outer case and the container to be heated. This partition member is made of a crimped plate member, and circularly arranged over the interior of the outer case. It is desirable that the partition be held on the outer case under its own elastic restoring force, which facilitates assembly of the outer case.

More preferably, a single faced crimped board should be wrapped around the outer periphery of the outer case with its liner facing outwards. The use of this single faced crimped board leads to a thin outer package with a superior heat insulating characteristic. The arrangement of the board with its liner facing outwards facilitates the wrapping of the crimped board.

In the portable heater, according to this invention, a crimped partition member having an engaging part constituted by an inward turnover of the partition member is preferably laid over the interior surface of the outer case, and a disk-shaped exhaust plate having a plurality of exhaust holes is preferably disposed with its outer periphery engaging the upper end of the outer case and with its inner edge upwardly extended. The extended portion of the exhaust plate is pressed against the outer upper brim of the container, whilst the outer lower brim of the container comes into contact with the engaging part of the partition member, thereby holding the container. Inwardly raised engaging sections are formed on the outer case in the vicinity of the upper and lower edges of the partition member provided on the inner surface of the outer case, and the partition member should preferably be held between the raised engaging sections.

By this arrangement, the container can be held at a fixed position relative to the outer case, and can also be held with sufficient strength. In addition, the container will not fall from the outer case when it is tipped, and the container can be easily integrated into the outer case.

A portable heater according to another aspect of this invention comprises: a burner positioned at the bottom of an outer case; a container to be heated disposed in an upper part of the outer case; a fuel tank for storing fuel gas to be supplied to the burner; an ignition means positioned in proximity to the burner for emitting gas from the burner and igniting the emitted gas; and an operation rod upwardly extending along the outer case with its lower end coupled to the ignition means and with its upper end extending further upward from the outer case, whereby the ignition means is actuated upon depression of the operation rod, so that the burner catches fire. The operation rod may be provided so as to be removable from the outer case by upwardly drawing out the rod.

In the case of the portable heater in which ignition takes place by the depression of the operation rod, when the container is heated by the ignition of the burner, combustion starts by a depressing operation, and ignition is effected without the need to look at the operating member located at a lower position, whereby the ignition operability of the burner is improved.

A portable heater according to a preferred aspect of this invention, is provided with a burner located at the bottom of an outer case; a container to be heated, at an upper surface of which an opening pull tab is provided, for containing liquid such as water with a hermetic seal, the container being positioned in an upper part of the outer case; and an ignition means for carrying out the igniting operation of the burner. After the container is heated with the pull tab open, liquid contents are poured through an outlet member attached to an upper part of the container. At least one side of this outlet member is attachable to an upper part of the container, and beverage materials such as tea leaves are kept in a holding section formed in the middle of the outlet member, and a block part is formed on at least one side of the holding section to prevent flow of the beverage materials from the holding section. Both surfaces of the holding section are detachably covered with sealing foil.

One surface of the outlet member is attachable to the top of the container, and the other surface is attachable to the top of the outer case. It is desirable that the block part be formed on the surface side of the holding section that is attached to the top of the outer case.

When the heater is not in use, the outlet member is attached to the top of the container, whereby the heater can be carried with its strength increased. After heating, the outlet member is attached to the outer case, liquid contents are poured from an opening of the container through beverage materials such as tea leaves.

BRIEF DESCRIPTION OF THE DRAWINGS

FIG. 11 is a plan view of the portable heater shown in FIG. 10;

FIG. 12 is a plan view of chief elements taken along the line A—A of FIG. 10;

FIG. 29 is a longitudinal cross sectional view of chief elements when the outlet member shown in FIG. 27 is in use.

BEST MODE FOR CARRYING OUT THE INVENTION

With reference to the accompanying drawings, each embodiment of a portable heater according to this invention will now be explained hereinbelow.

FIRST EMBODIMENT

Figure 1:
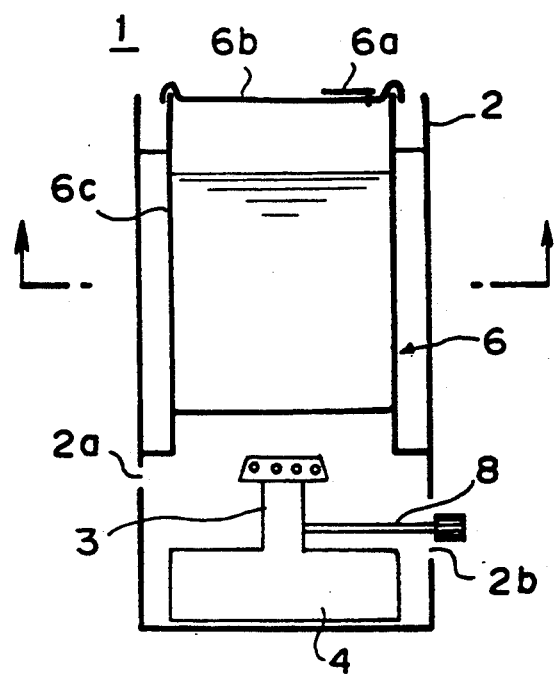
FIG. 1 is a cross sectional view showing a principal structure of a portable heater according to one embodiment of this invention.
Figure 2:
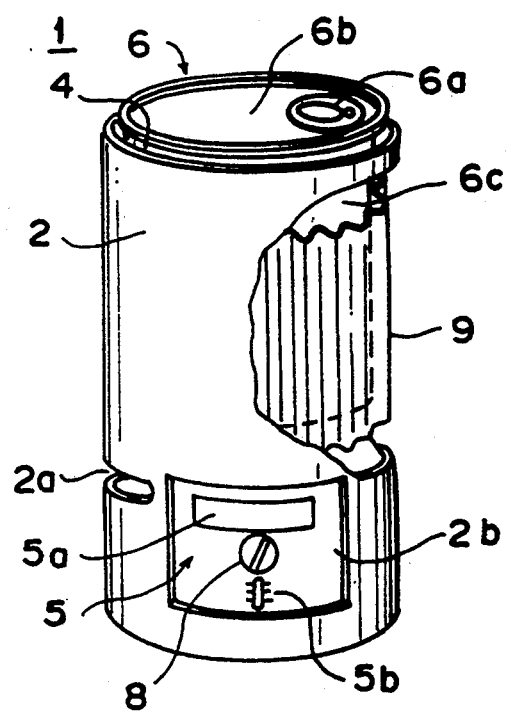
FIG. 2 is a partially opened perspective view showing one example of the appearance of the portable heater shown in FIG. 1.

FIG. 1 is a cross sectional view showing a principle structure of a portable heater according to this embodiment; and FIG. 2, a partial cut-away perspective view showing one example of the appearance of the portable heater.

A portable heater 1 (a canned food with a burner) according to this embodiment is basically composed of: a cylindrical outer case 2 with at least its upper end open; a container to be heated 6 fixedly housed in the upper part of the outer case 2 with a gap therebetween for updraft of combustion gases, and being made of a heat resisting cylindrical container main body 6c, on the upper-end surface of which an opening tab 6a is formed; a burner 3 equipped with an ignition means 8 and fixedly housed in a lower part of the outer case 2 so that the burner can heat the container 6; and a fuel tank 4 fixed in a lower part of the outer case 2 for supplying fuel to the burner 3. The container 6 contains contents which are heated when the heater is in use, and the outer case 2 is provided with a vent hole 2a for supplying air from the outside to the burner 3 and an opening 2b for operation of the ignition means 8 from the outside.

In an example shown in FIG. 2, the opening 2b for operation of the ignition means 8 from the outside is provided with a window 5a through which flames of the burner 3 can be checked from the outside and a scaled window 5b by which the quantity of remaining fuel in the fuel tank 4 is checked. For these ends, the fuel tank 4 is at least partially composed of transparent materials so that remaining fuel in the tank can be seen from the outside. The window 5b of the outer case 2 should be positioned on the part of the fuel tank made of transparent materials through which remaining fuel can be seen from the outside.

With respect to a means for providing check of flames of the burner 3 from the outside, if it is difficult to form the window 5a from the view point of design, it is also possible to make an arrangement whereby flames of the burner 3 will be checked from the outside at a location which is easy to see using optical means such as an optical fiber or a mirror instead of the window 5a. Specifically, a window for checking ignition of the burner 3 may be provided on the outer case 2, and an optical means for optically transmitting images of flames to the window may be provided between the window and a location which is opposite to the flames of the burner 3.

Figure 3A:
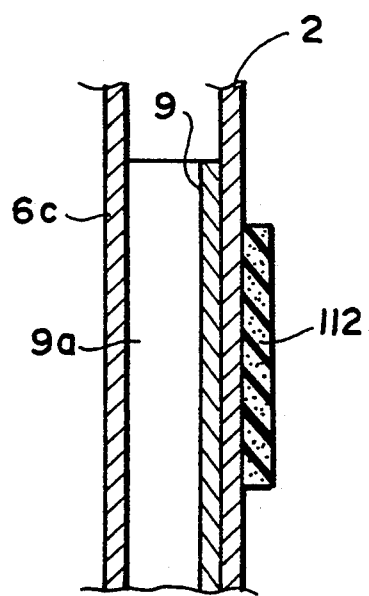
FIGS. 3 (A) and (B) are enlarged cross sectional views of chief elements of a portable heater showing example structures of an outer case.
Figure 3B:
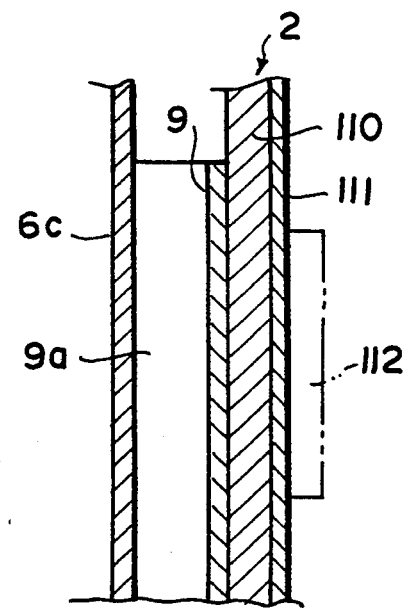

A heat insulating expanded member 112 such as a foamed plastic material is wrapped around the outer periphery of the metal outer case 2 as shown in FIG. 3 (A). It is desirable that a heat insulating means should be provided between the outer peripheral surface of the outer case 2 and the container 6, wherein the heat insulating means has a sufficient heat insulating effect to prevent a hand from being burnt upon contact with the outer peripheral surface of the outer case 2 while the container 6 is heated by the burner 3. As such, it is considered that the outer case 2 can be at least partially produced from a material with a high heat insulating effect, or that a cylinder made of a heat insulating material can be laid on the inner side of the outer case 2. These arrangements are shown in FIG. 3 (B).

FIG. 3 (B) is an enlarged view showing a longitudinal cross section of the structure of the outer case 2. The outer case has a double-layered structure consisting of an inside heat insulating member 110 and an outside cylinder body 111. The cylinder body 111 on the exterior side of the heater is made of metal laminate, for example, an aluminum foil, and the cylinder body is formed into a cylindrical shape with its top open. The heat insulating member 110 is produced from materials with a low thermal conductivity such as paper (for example, self-extinguishing and heat-resistant paper), and the heat insulating members are laminated, one over the other, in a cylindrical shape on the interior surface of the cylindrical main body 111. Outer ridges of the partition plate 9 make contact with the interior surface. Moreover, the heat insulating expanded member 112 such as urethane foam is arranged in the shape of a strip, as indicated by dotted lines, on a part of the outer surface of the cylindrical main body 111 of the outer case 2.

The use of the heat insulating member 110 as mentioned above results in a drop in temperature of the exterior surface of the outer case, which facilitates the handling of the heater. In addition, this leads to an increase in thermal efficiency, whereby a reduction of fuel consumption and improvements in heat retaining property can be obtained.

Figure 4:
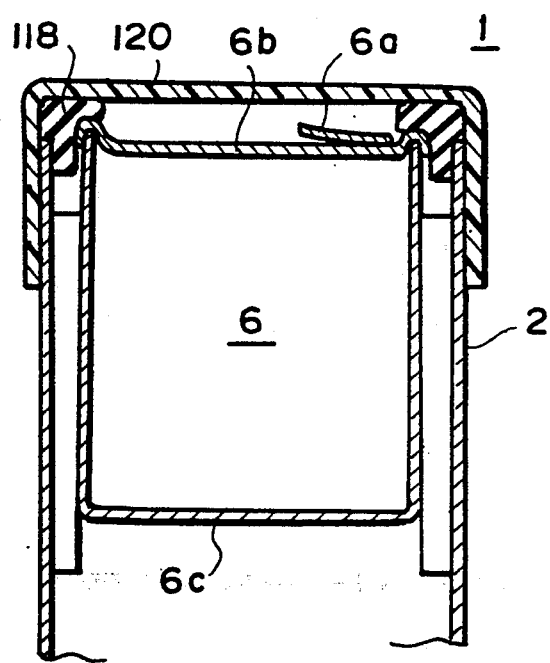
FIG. 4 is a cross sectional view partially showing an example of a portable heater equipped with a vessel to be used after the heating of the heater.

The top of the outer case 2 may be covered with a vessel which becomes a dish for holding the heated contents of the container 6. An example of such a heater is illustrated in FIG. 4. In the example shown in FIG. 4, a ring-shaped packing piece 118 is pressed between the topmost outer periphery of the container 6 and the topmost brim of the outer case 2. This protects the portable heater 1 from damage caused by absorbing impacts of the heater when it is dropped upside down. A vessel 120 which will become a dish for holding the heated contents of the container 6 is disposed on the packing piece so as to cover the heater. Namely, the vessel 120 is fitted on this ring-shaped packing piece 118 by pressing.

Figure 5A:
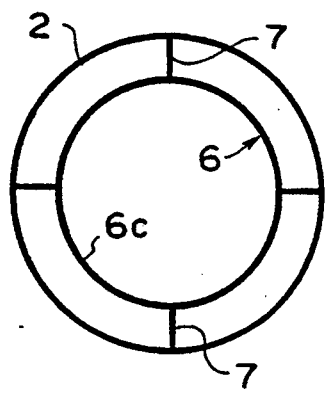
FIGS. 5 (A) and (B) are horizontal cross sectional schematic views of a portable heater showing example structures of gaps between an outer case and a container to be heated.
Figure 5B:
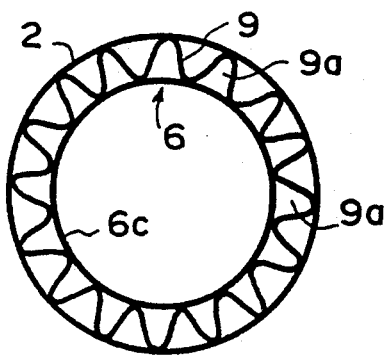

A gap is formed between the outer case 2 and the container main body 6c of the container 6 so that combustion gases can upwardly flow through that gap. A means for holding both the outer case 2 and the container main body 6c also acts as a structure for constituting this gap. Practically, for example, a plurality of simple longitudinally extended partition members 7 are disposed as shown in FIG. 5 (A). In this case, the partition members 7 act to fix the outer case and the container main body, and also spacing between the partition members 7 serves as a gap for updraft of combustion gases. As shown in FIG. 5 (B), a longitudinally extended crimped partition member 9 may be placed as shown in FIG. 5 (B). This crimped partition member 9 extends further downward from the bottom end of the container main body 6c as can be seen from FIGS. 1, 2 and 4. In this case, the partition member 9 acts to fix both the outer case and the container main body, and internal spacing 9a of the crimps of the partition member 9 serves as a gap for updraft of combustion gases. This arrangement leads to a significant increase in combustion efficiency.

A piezoelectric type automatic ignition device is employed as the ignition means 8 of the burner 3, and this device is desirable in practical use because of its convenience.

It is desirable that the container 6 should be provided with a drill means which automatically bores an exhaust hole in the container main body 6c for expelling steam when an internal pressure or heat of the container main body 6c exceeds a predetermined level due to the heating of the contents of the container. An example of such a heater is illustrated in FIGS. 6 through 8.

Figure 6:
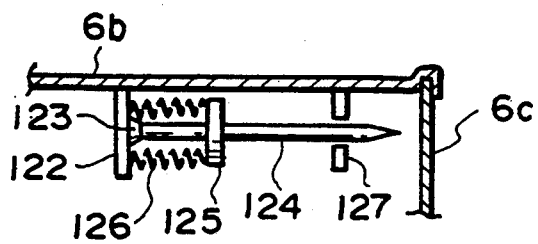
FIG. 6 is a schematic view showing one example of a safety means against the overheating of a portable heater.

FIG. 6 shows a drill means disposed inside a top plate 6b of the container 6 for automatically boring an exhaust hole in the container main body 6c in order to expel steam, or the like, when the heat of the container main body 6c goes beyond a predetermined level. The drawing shows an example of the drill means comprising: a support plate 122 standing on the under surface of the top plate 6b; a drill pin 124 with its rear end fixed to the support plate by an adhesive 123 which is melted by heat above a predetermined temperature; a compressed spring 126 sandwiched between a flange 125 of the drill pin 124 and the support plate 122; and a guide plate 127 for approximately directing the tip end of this drill pin 124. The tip end of this drill pin 124 is closely opposite to the container main body 6c, and this pin is arranged in such a manner that the drill pin 124 bores a small hole on the container main body 6c under the force of the spring 126 due to the melting of the adhesive 123 when the container 6 is heated beyond a predetermined level by the burner 3, so that steam or the like is expelled through the hole.

Figure 7:
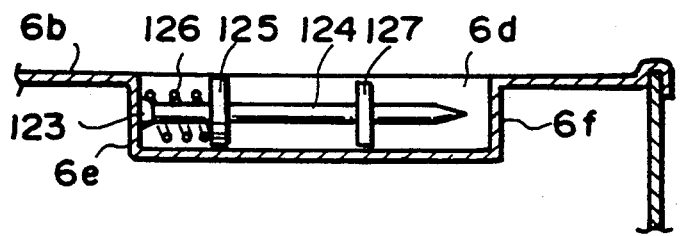
FIG. 7 is a schematic view showing another example of a safety means against the overheating of a portable heater.

FIG. 7 illustrates another example of the drill means, which is incorporated in a recess 6d formed on the outer surface of the top plate 6b of the heater 6, for automatically boring an exhaust hole in the container main body 6c in order to expel steam, or the like, when the heat of the container main body 6c exceeds a predetermined level. In this example, the drill means comprises the recess 6d formed on the top plate 6b; the drill pin 124 with its rear end fixed to a side wall 6e of the recess by the adhesive 123 which is fusible by heat above a predetermined temperature; the compressed spring 126 sandwiched between the flange 125 of the drill pin 124 and the support plate 122; and the guide plate 127 for approximately directing the tip end of the drill pin 124. The tip end of this drill pin 124 is in close proximity to an opposite side surface 6f of the side surface 6e in the recess 6d of the top plate 6b. When the container 6 is heated beyond a predetermined temperature by the burner 3, the adhesive 123 melts, and then the drill pin 124 bores a small hole on the side surface 6f under the force of the spring 126, whereby steam, or the like, is expelled through the hole.

Figure 8:
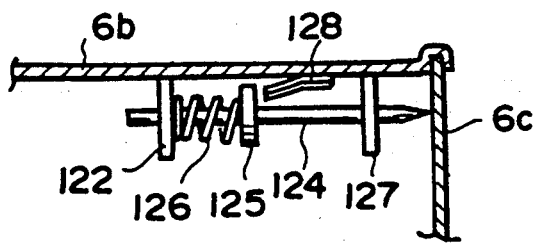
FIG. 8 is a schematic view showing still another example of a safety means against the overheating of a portable heater.

FIG. 8 illustrates still another example of the drill means disposed inside the top plate 6b of the container 6 for automatically boring an exhaust hole in the container main body 6c in order to expel steam, or the like, when the heat of the container main body 6c exceeds a predetermined level. This drill means is composed of the support plate 122 standing on the under surface of the top plate 6b; the drill pin 124 with its rear end fixed to the support plate; the compressed spring 126 sandwiched between the flange 125 of the drill pin 124 and the support plate 122; the guide plate 127 for directing the tip end of this drill pin 124; and a bimetal locking member 128 for obstructing advancement of the drill pin 124 induced by the compressed spring 126 by an abutment against the flange 125. When the container 6 is heated beyond a predetermined level by the burner 3, this bimetal locking member 128 is deformed, so that the drill pin is released from its locked state. Then, the drill pin 126 bores a small hole on the container main body 6c under the force of the spring 126, as a result of which steam or the like is expelled.

These safety devices are intended to prepare for the overheating of the heater. A safety device may be provided for boring a small hole on the container main body 6c in the same manner as the foregoing device when an internal pressure of the container 6 exceeds a predetermined level, regarding or disregarding overheating, so that steam or the like can be expelled. Various types of pressure-sensitive means can be used as a pressure-sensitive means of this device which operates at a pressure above a predetermined level.

Plastic with a superior pressure resistance can be employed for the fuel tank 4. To make it possible to see the amount of remaining fuel, it is desirable that the tank be made of transparent plastic, for example, transparent nylon. A rubber stopper may be removably provided on the bottom of the fuel tank so that the tank can be refilled with gas if fuel gas has escaped from the tank, and a blind seal is attached on this rubber stopper outside the outer case 2. Alternately, instead of this rubber stopper, a conventional stopper consisting of a plastic screw and an O-shaped rubber ring in combination may be used.

As the burner 3, various types of known burners may be used. For example, this burner may be formed into a double push-in structure so that this burner can be compactly housed. Practically, a combustion cylinder which affects the height of a burner is expandably formed. When a heater is carried around, the combustion cylinder is shortened, and the burner is incorporated into the outer case, thereby rendering the entire heater compact. When the burner is used, the combustion cylinder is expanded so that the heater can be used with its entire length fully extended. The fuel tank may be formed into a ring shape so that the combustion cylinder of the burner can be fitted into the center aperture or recess of the tank, whereby the height of the tank is reduced, and the burner can be compactly housed. The burner may have a double-staged structure including a pilot burner and a main burner, and the pilot burner may be arranged to be piezoelectrically ignited.

SECOND EMBODIMENT

Figure 9:
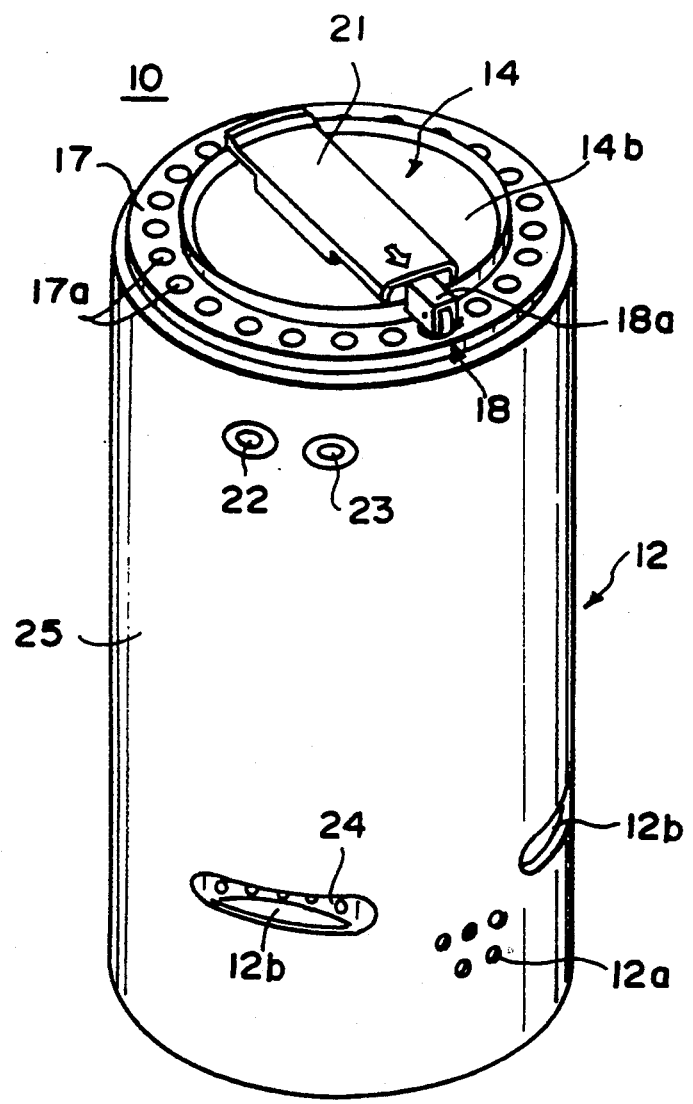
FIG. 9 is a perspective view of an appearance of a portable heater according to a second embodiment of this invention.
Figure 10:
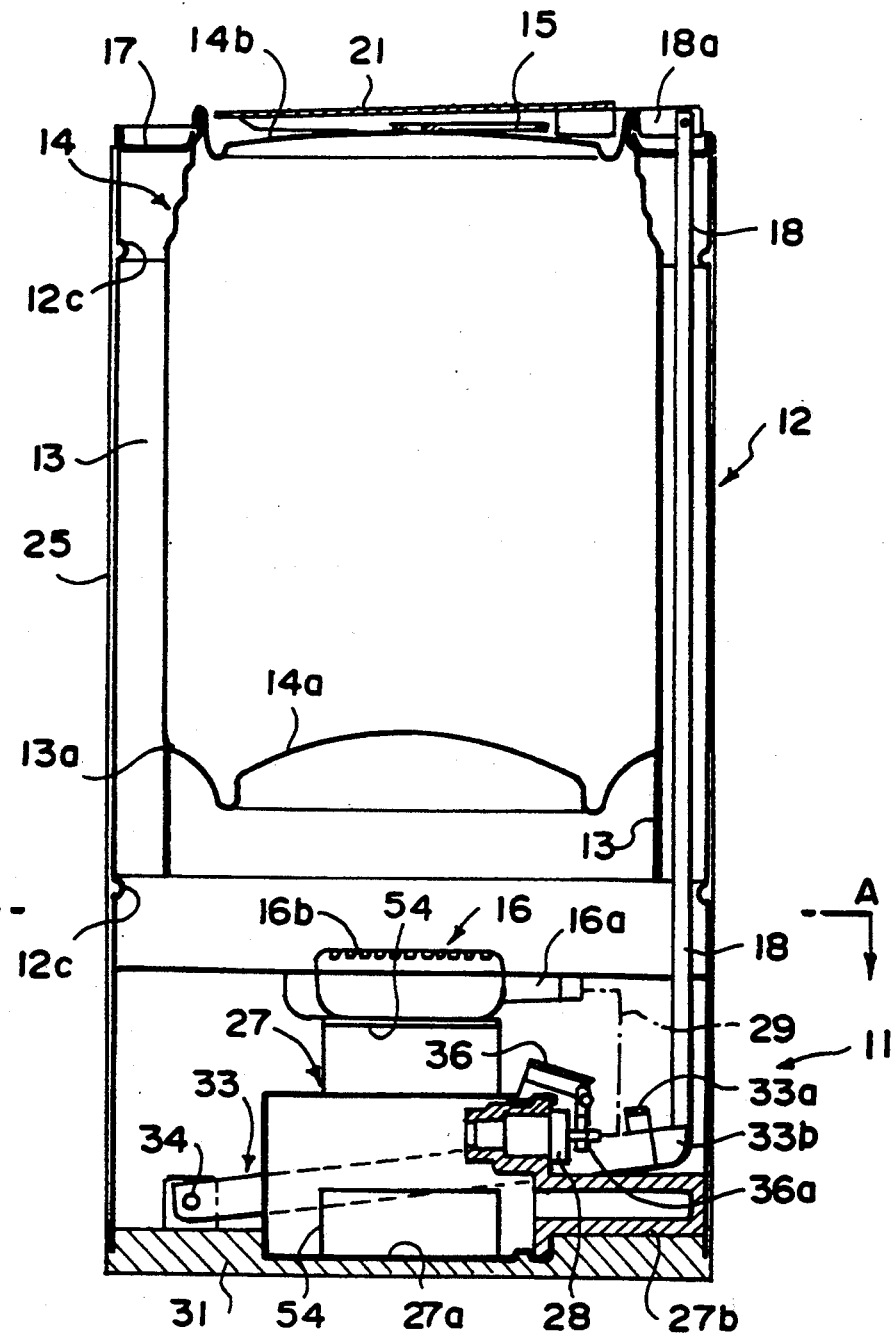
FIG. 10 is a cross-sectional side view showing a principal structure of the portable heater shown in FIG. 9.
Figure 13:
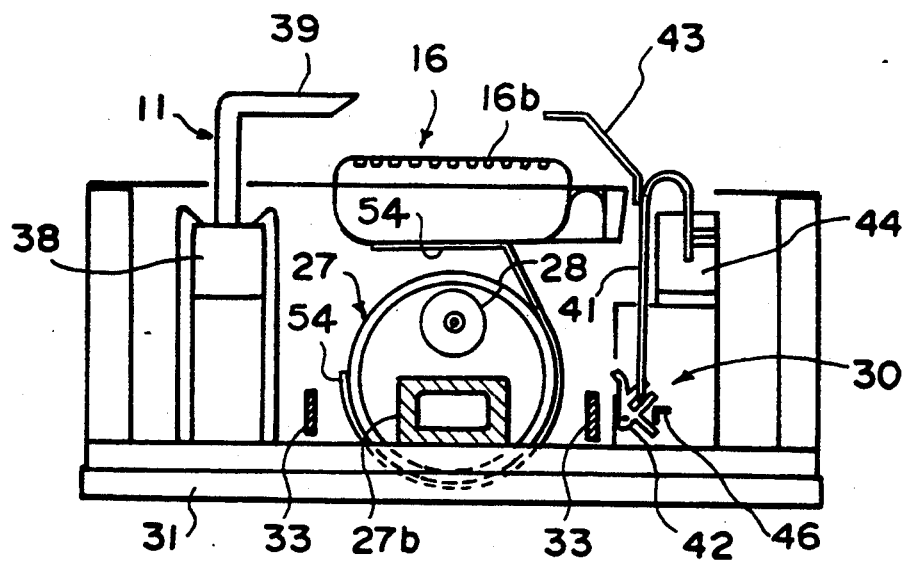
FIG. 13 is a partial cross-sectional front view taken along the line B—B of FIG. 12.
Figure 14:
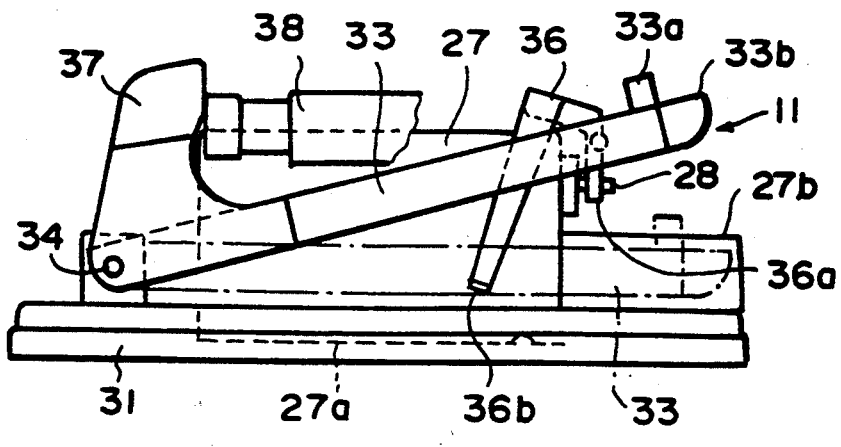
FIG. 14 is a side view of chief elements shown in FIG. 12.

FIGS. 9 to 20 illustrate examples of more concrete structures of a portable heater according to this invention. FIG. 9 is a perspective view showing the appearance of a portable heater according to this embodiment; FIG. 10, a cross sectional view showing a principle structure of the heater; FIG. 11, a plan view of the heater shown in FIG. 10; FIG. 12 shows a plane structure of a burner; FIG. 13, a cross sectional view of the structure shown in FIG. 12; and FIGS. 14 and 15, schematic side views of the structure shown in FIG. 12.

A portable heater 10 is provided with an outer case 12 with its upper end open; a container to be heated 14 fixedly held in an upper part of the outer case 12 with a gap between the outer case and the container for updraft of combustion gases; a burner 16 fixedly housed in a lower part of the outer case 12 for heating the container 14; and an ignition means 11 for igniting the burner 16.

An exhaust plate 17 is interposed between the upper end of the outer case 12 and the top brim of the container 14. This exhaust plate 17 is formed in a circular shape, and vent holes 17a are formed along the circumference of the exhaust plate at given intervals. An operation rod 18 for carrying out the igniting operation of the burner 16 extends upwards along the outer case 12, whereby ignition is effected by operations from the top of the container. In other words, downward thrust of the operation rod 18, which will be explained in detail later, causes the ignition means 11 located at the bottom of the heater to be operated, whereupon the burner is ignited. An upper end portion 18a of the operation rod 18 extending through the exhaust plate 17 is foldable to the inside of the container on the upper surface of the container 14. The operation rod 18 is formed in such a manner that it can be removed from the outer case by upwardly pulling the rod out of the heater, and extinguishing of flame can be effected by inserting the pulled-out rod into another position.

The container 14 is composed of a heat-resistant main body 14a with its top closed by a top plate 14b having a pull tab 15 for opening the container, and holds liquid contents therein. There is provided an opening member 21 for carrying out the opening of the pull tab 15 in connection with the igniting operation of the operation rod 18. In operation, this opening member 21 engages with the pull tab 15 and the upper end 18a of the operation rod 18 folded to the inside of the heater (urged upright). Pulling of the opening tab 21 causes the pull-tab 15 to be pulled up, so that the container 14 is opened. At this time, the upper end 18a of the operation rod 18 is released to stand upright, and further raising of the opening member 21 thrusts the operation rod 18 downwards, thereby igniting the burner 16.

An ignition confirmation member 22 made of a heat-sensitive material such as a heat-sensitive paint is formed on the exterior surface on an upper part of the outer case 12. This ignition confirmation member 22 possesses a heat sensitive characteristic whereby a color of the confirmation member changes or develops when the ignition confirmation member is heated by combustion gases uprising along the outer case 12 which results from the ignition of the burner 16, and reaches a predetermined temperature. In this embodiment (see FIG. 9), the ignition confirmation member 22 is made up of, for example, material which changes its color at a temperature of around 40 degrees Centigrade. In addition to this, a high-temperature warning member 23 made of a heat-sensitive material which changes its color at a temperature of about 60 degrees Centigrade is provided side by side with the ignition confirmation member 22.

The outer case 12 has first vent port 12a and second vent port 12b for introducing air for combustion purposes opened in the vicinity of the burner 16 at the bottom of the outer case (see FIG. 9). In practice, the first vent port 12a is composed of five small holes formed below the burner 16, and the laterally extended second vent port 12b is composed of four holes formed on a curved surface above the burner 16. A baffle plate 24 with small holes is disposed to the inside of this second vent port 12b. This baffle plate 24 is intended to prevent unforeseeable extinguishing of flames by wind from the outside, and to prevent a backfire from the inside of the heater. To assure a sufficient amount of air so that perfect combustion of the burner 16 can be achieved, the number and diameter of holes of the first vent port 12a, the size of the second vent port 12b, and the number and diameter of small holes of the baffle plate 24 are adequately set in accordance with a consumption of gas. If a total area of the small holes is small, incomplete combustion will take place.

The baffle plate 24 of the second vent port 12b is formed by cutting the upper and lower sides of the second vent port 12b, and convexly pressing a separated sheet to the inside of the heater while the second vent port 12b is opened by pressing the outer case 12.

Figure 21:
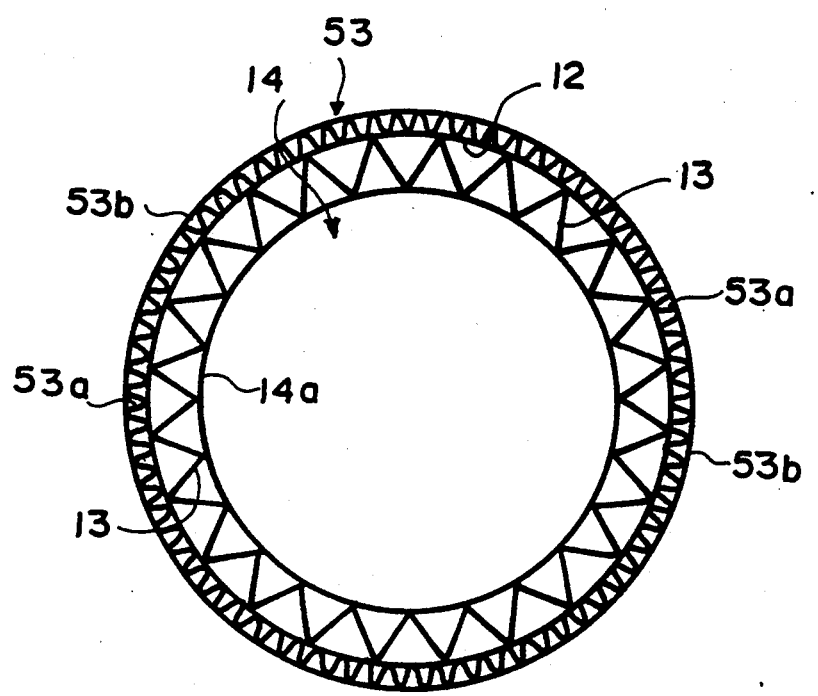
FIG. 21 is a cross sectional schematic view showing an example in which a single faced crimped board is wrapped around the outer periphery of an outer case.

A heat insulating material 25 such as paper or a single faced crimped board 53 as shown in FIG. 21 is laminated on the outer peripheral surface of the outer case 12, but the ignition confirmation member 22 and the high-temperature warning member 23 are directly disposed on the outer case or disposed on the heat insulating material 25 or the single faced crimped board 53 in accordance with the heat sensitive characteristic of these members.

The single faced crimped board 53 wrapped around the outer peripheral surface of the outer case 12, as shown in FIG. 21, is composed of a crimped core paper 53a and a liner 53b attached to one surface of the board. The crimped core paper 53a is wrapped around, while remaining in contact with, the outer peripheral surface of the outer case 12 with the liner 53b thereof facing outwards, whereby a thin exterior with a superior heat insulating characteristic is obtained. Also, the use of the crimped board with the stretchable crimped core paper 53a facing inwards facilitates the wrapping of the crimped board.

Concrete structures of the burner 16 and its ignition means 11 will now be described. The burner 16 is situated at the center of a lower part of the container 14, and is kept away from the bottom of the container by a predetermined distance. This burner is manufactured by pressing a metal plate, and is made up of a gas inlet part 16a and a gas outlet part 16b including gas outlets. A fuel tank 27 for storing fuel to be supplied to this burner 16 is positioned on a base member 31 at the bottom of the heater. This fuel tank 27 has a metal cylindrical body 27a, a front part of which is closed by a cover member 27b. A valve mechanism 28 for opening and closing the supply of gas is disposed above the front covered portion of the tank. A fuel pipe 29 is connected from the valve mechanism 28 to the gas inlet part 16a of the burner 16. A part of the cover member 27b of the fuel tank 27 is made of transparent plastic, and is protruded so that remaining fuel can be observed from the outside.

The ignition means 11 and a safety device 30 which prepares against the unforeseeable extinguishing of flames are disposed around the burner 16 and the fuel tank 27.

The ignition means 11 is provided with an ignition lever 33 which supplies gas to the burner 16 and ignites the burner. This ignition lever 33 extends along both sides of the fuel tank 27 with its one end rotatably supported by a rotating shaft 34 and with its remaining end connected to a coupling part 33a ahead of the fuel tank 27. The lower end of the operation rod 18 is connected to an engaging part 33b which is a part of the coupling part 33a, and the ignition lever 33 is downwardly rotated in accordance with downward thrust of the operation rod.

A first arm 36 for opening and closing the valve mechanism 28 is pivotally disposed, and an engaging portion 36a formed at one end of the first arm 36 engages the valve mechanism 28. The top plate member of the first arm situated within the ignition lever 33 has two prongs which downwardly extend with the valve mechanism held therebetween. A lower end portion 36b of the first arm engages a bottom-side edge center of the ignition lever 33 which is pivotally rotated to a plane level (see FIG. 14).

In practice, when the ignition lever 33 is depressed, the lower end portion 36b of the first arm 36 engages the ignition lever, and then the first arm is pivoted so as to depress the ignition lever. As a result of this, the engaging portion 36a opens the valve mechanism 28, so that gas in the fuel tank 27 is supplied to the burner 16.

A second arm 37 which rotates in accordance with the rotation of the ignition lever 33 is fixed around the rotating shaft 34. The second arm 37 operates a piezoelectric ignition unit 38, and is arranged to apply a discharge voltage from the piezoelectric ignition unit 38 to a discharge electrode 39 in response to depressing actions of the ignition lever 33, thereby effecting ignition and combustion (see FIG. 13).

Figure 17:
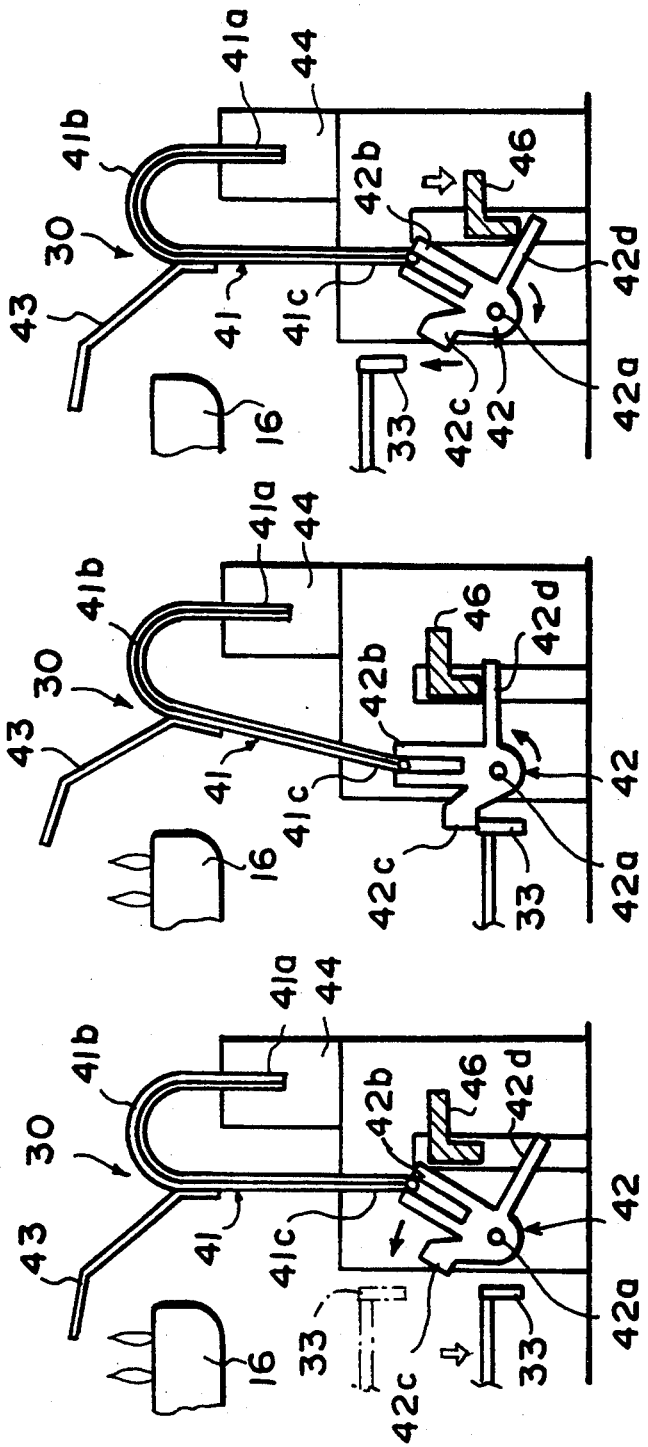
FIGS. 17 (A), (B) and (C) are front views of chief elements showing operating states of a safety device against unforeseeable extinguishing of the flame.

The safety device 30 preparing against unforeseeable extinguishing of flames is provided with a bimetal member 41 as shown in FIG. 17. This bimetal member 41 is formed in an inverted U-shape with its shorter fixed portion 41a fixed to the upper end of a support part 44 standing on the side of the ignition lever 33 and with its remaining displacing portion 41c, which is connected to the fixed portion 41a via a topmost curved portion 41, extending downwards. The lower end of the displacing portion engages a hook 42. The hook 42 is rotatably supported around an intermediate pivot 42a. The tip end of an inner arm 42b engages the tip end (pin) of the displacing portion 41c of the bimetal member 41, and causes pivotal rotation from a low temperature state shown in FIG. 17 (A) to a temperature raised state shown in FIG. 17 (B) in accordance with thermal deformation of the bimetal member. The tip end of an outer arm 42c is arranged to come above the ignition lever 33 so that it can engage the ignition lever. An engaging position of the hook 42 is set in such a manner that the outer arm comes into contact with the top side of the ignition lever 33 while the ignition lever 33 is depressed or kept in an ignition operation location, and hence the ignition lever 33 is held in the ignition operation location.

A heat-sensitive part 43 is connected to the curved portion 41b of the bimetal member 41. This heat-sensitive part 43 is made of metal having a high thermal conductivity, and one end of the part is fixed to the bimetal member 41 and the other portion of the same extended to the vicinity of the burner 16. This heat sensitive part transfers heat to the bimetal member 41 upon receipt of combustion heat from the burner 16.

Figure 15:
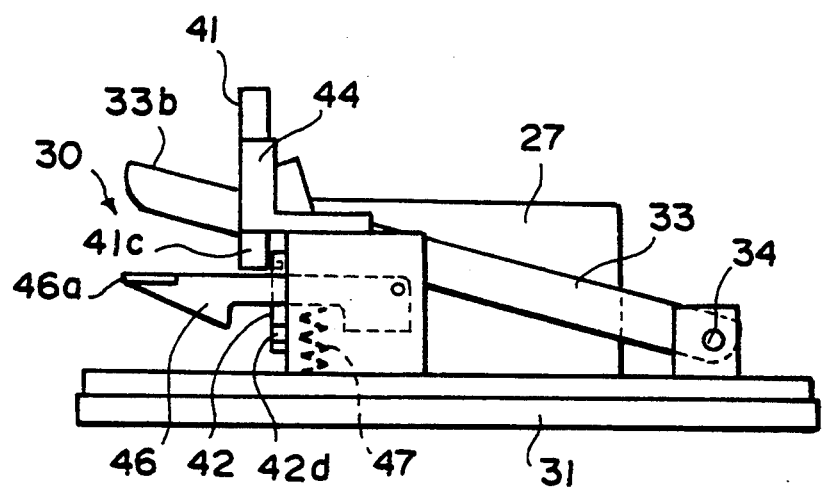
FIG. 15 is a side view of the chief elements as seen from another side.

As can be seen from FIG. 15, a fire extinguishing mechanism is provided for extinguishing flames in connection with the hook 42. This fire extinguishing mechanism is constituted of a fire extinguishing engaging leaf 42d which substantially horizontally extends and a fire extinguishing lever 46 which is disposed above the engaging leaf 42d, and is vertically pivotable. This fire extinguishing lever 46 is upwardly forced by a return spring 47. An end engaging part 46a extends to the vicinity of the interior surface of the outer case 12. As with the ignition lever 33, the engaging part 46a can be operated by depressing the operation rod 18 inserted at a location which is different from the ignition position corresponding to the engaging portion 33b of the ignition lever 33. The engaging part is pivoted downwards by the operation rod 18, which in turn causes the fire extinguishing leaf 42d of the hook 42, remaining in the combustion maintaining state shown in FIG. 17 (B), to be depressed and pivoted downwards in a fire extinguishing direction as shown in FIG. 17 (C). Hence, the ignition lever 33 is released from the hook 42.

A gap for updraft of combustion gases is formed between the outer peripheral surface of the outer case 12 and the container main body 14a of the container 14. A means for holding the outer case 12 and the container 14 also acts as an arrangement which constitutes this gap. Namely, as shown in FIGS. 10 and 11, a longitudinally extended sinusoidal crimped partition member 13 is sandwiched between the outer case 12 and the container 14, and this crimped partition member 13 extends further below the lower end of the container main body 14. In this arrangement, the partition member 13 fixedly holds both the outer case and the container main body, and inner gaps between the ridges of the partition member 13 act as channels for the updraft of combustion gases.

Figure 16:
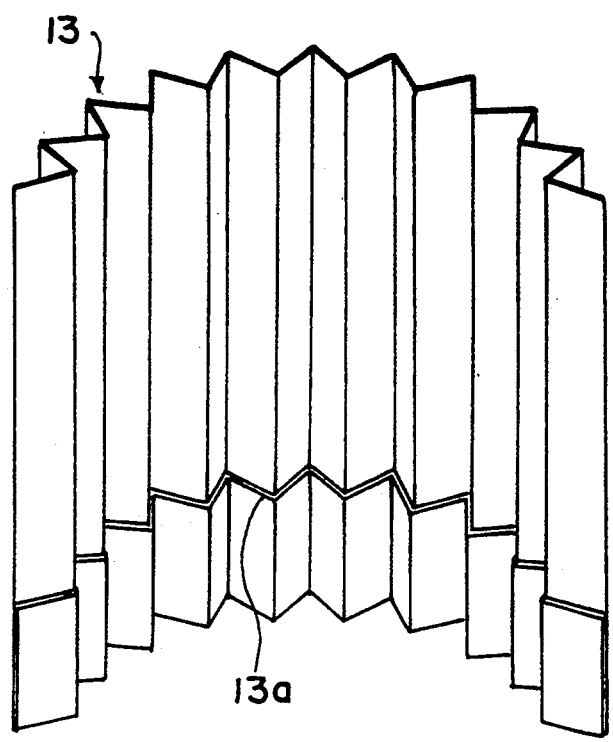
FIG. 16 is a perspective view of a partition member.
Figure 18:
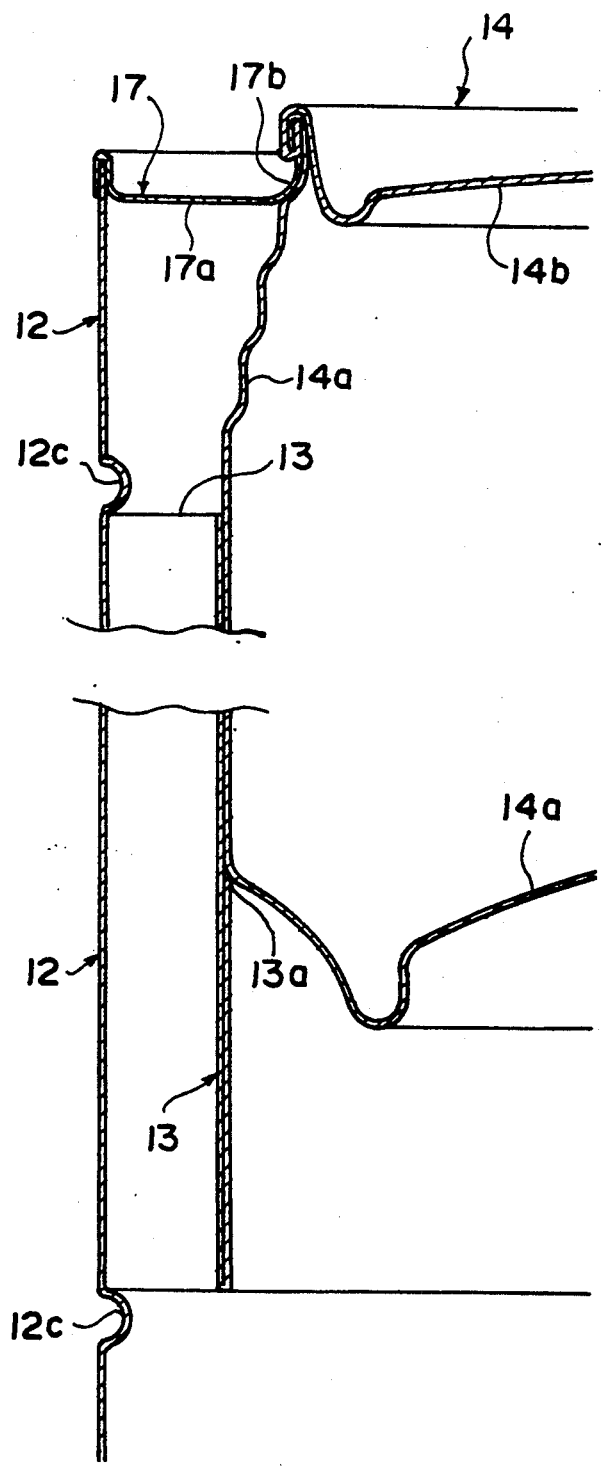
FIG. 18 is an enlarged cross sectional view showing the upper and lower portions of a supporting structure of a container to be heated.

As shown in an enlarged view of FIG. 18, a fixing structure for the container 14 includes bead-like inwardly raised engaging portions 12c provided at corresponding locations on the outer case 12 of the upper and lower ends of the partition member 13. The crimped partition member 13 is inserted into the outer case 12 while being warped into the form of a tube, as shown in FIG. 16, and then it is released. The outer periphery of the partition member 13 is pressed, under its recovery force, against the interior surface of the outer case 12. The upper and lower ends of the partition member are held between the raised engaging portions 12c, whereby the partition member is held on the outer case 12. Also, the lower end of this partition member has a predetermined length of an inwardly turned edge, and the upper end of this inwardly turned edge is a bottom engaging part 13a for supporting the bottom outer periphery of the container 14. Moreover, the inner peripheral flange 17b of the exhaust plate 17 engages the upper outer brim of the container 14.

The attachment of the container 14 with the above-described arrangement involves the steps of: inserting the partition member 13 into the outer case 12; inserting the container 14 into the center of the partition member, so that the lower end outer periphery of the container comes into contact with the engaging part 13a of the partition member 13, and is hence supported by the engaging part; and fitting the exhaust plate 17 on the container, so that the inner peripheral flange 17b of the exhaust plate 17 supportingly engages the upper brim of the container 14, and the outer periphery of the exhaust plate fixed to the outer case 12 supports the upper part of the container 14. Thereby, the container 14 will not fall away from the outer case 12 when the heater is carried around or tipped, and hence the container 14 can be constantly held in place.

As shown in FIGS. 10 and 13, a heat transfer plate 54 is provided for transferring heat from the burner 16 to the fuel tank 27. The heat transfer plate 54 is made of a metal plate such as copper or aluminum. One end of this heat transfer plate is wrapped around the outer surface of a metal tube 27a of the fuel tank 27, and the other end is fixedly adhered to the bottom of the burner 16. This heat transfer plate 54 prevents a drop in temperature of the fuel tank 27. Since vaporized fuel gas is supplied to the burner 16 from the fuel tank 27, a temperature of the fuel tank 27 drops due to a vaporization latent heat of the fuel gas, and hence an internal pressure of the fuel tank decreases. This causes the gas flow rate to be varied, and eventually the amount of combustion heat of the burner 16 drops. To avoid such a problem, heat transferred from the burner 16 to the fuel tank 27 through the heat transfer plate 54 warms the fuel tank 27, and suppresses a temperature drop of the fuel tank. As a result of this, the gas flow rate is improved, and it becomes possible to assure a stable gas flow rate over the period of combustion.

Figure 22:
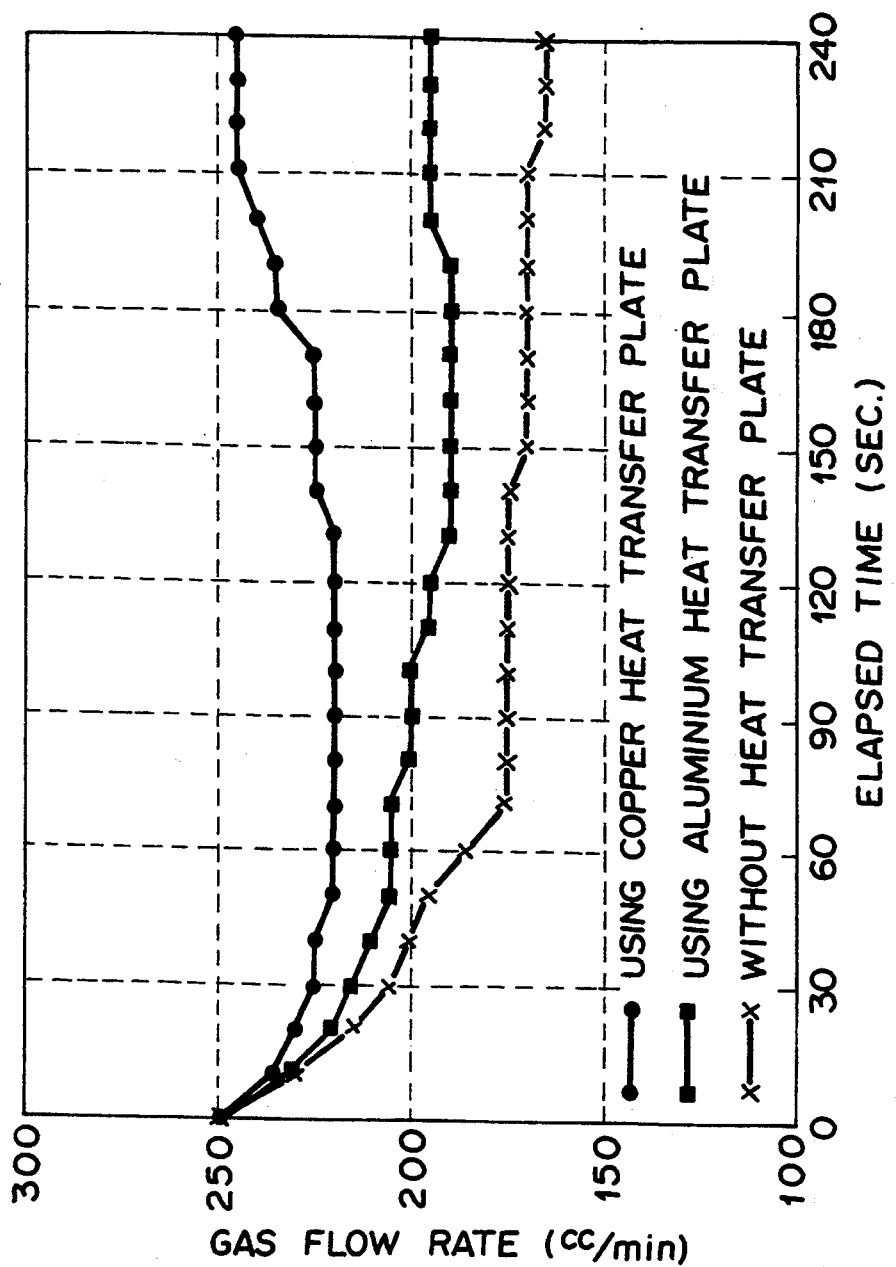
FIG. 22 is a graph showing variations in gas flow rate with respect to an elapsed time when a fuel tank is provided with a heat transfer plate.

FIG. 22 illustrates data obtained from experiments conducted to confirm improved effects on the gas flow rate by the use of the heat transfer plate 54. In these experiments, a preset value of a gas flow rate in accordance with the combustion of the burner 16 was set to 250 cc/min., and variations in gas flow rate in accordance with the elapse of time were measured. When the heat transfer plate 54 was not used, the gas flow rate dropped as time elapsed. In contrast to this, when the copper plate (a thickness of 0.2 mm) or an aluminum plate (a thickness of 0.2 mm) was used as the heat transfer plate 54, there was a drop in flow rate at the first stage as time elapsed, but after the elapse of several seconds, the gas flow rate showed a tendency to increase when transferred heat took effect. Especially in the case of the heat transfer plate 54 made of an aluminum plate, superior results were obtained.

Figure 19:
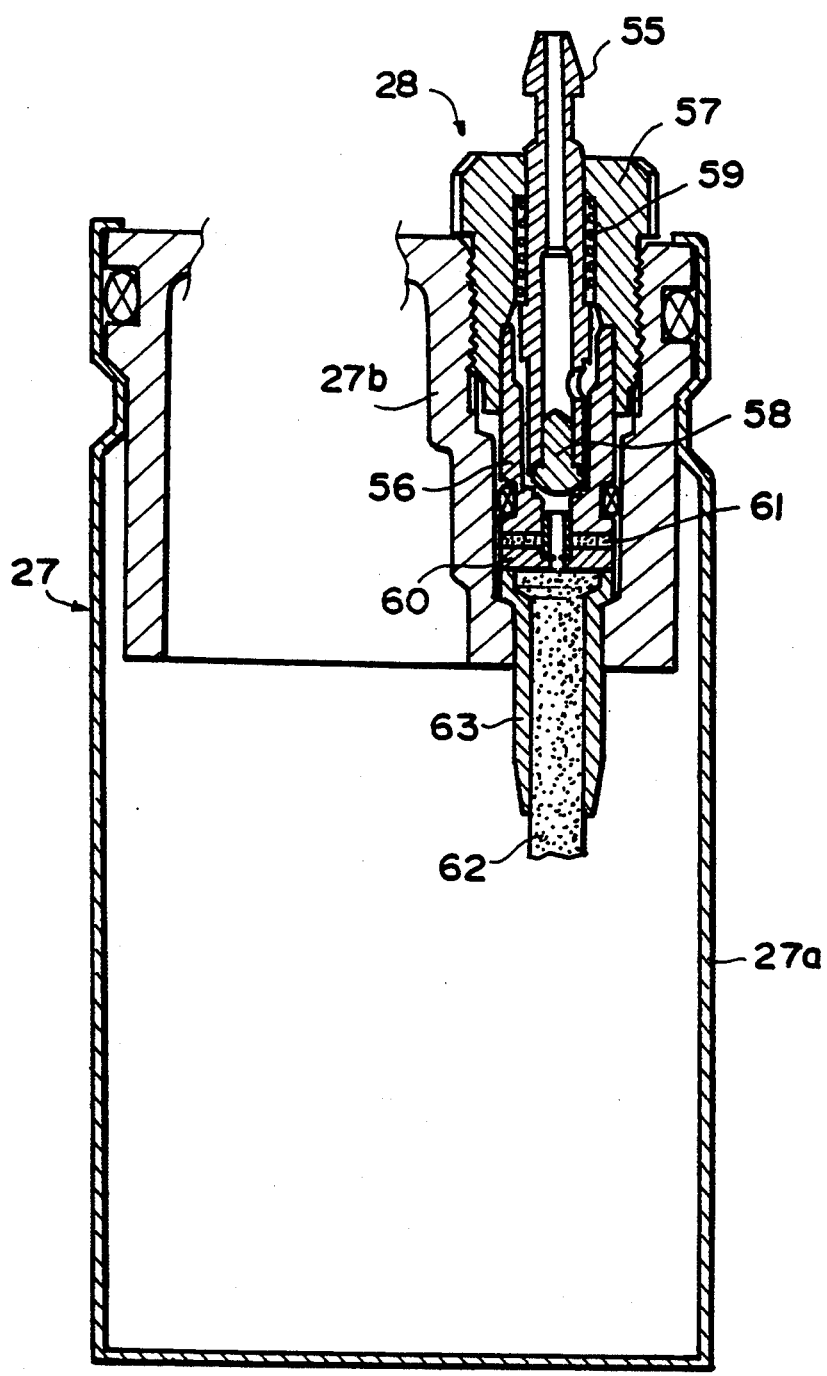
FIG. 19 is a cross sectional view showing a valve mechanism provided on a fuel tank.
Figure 20:
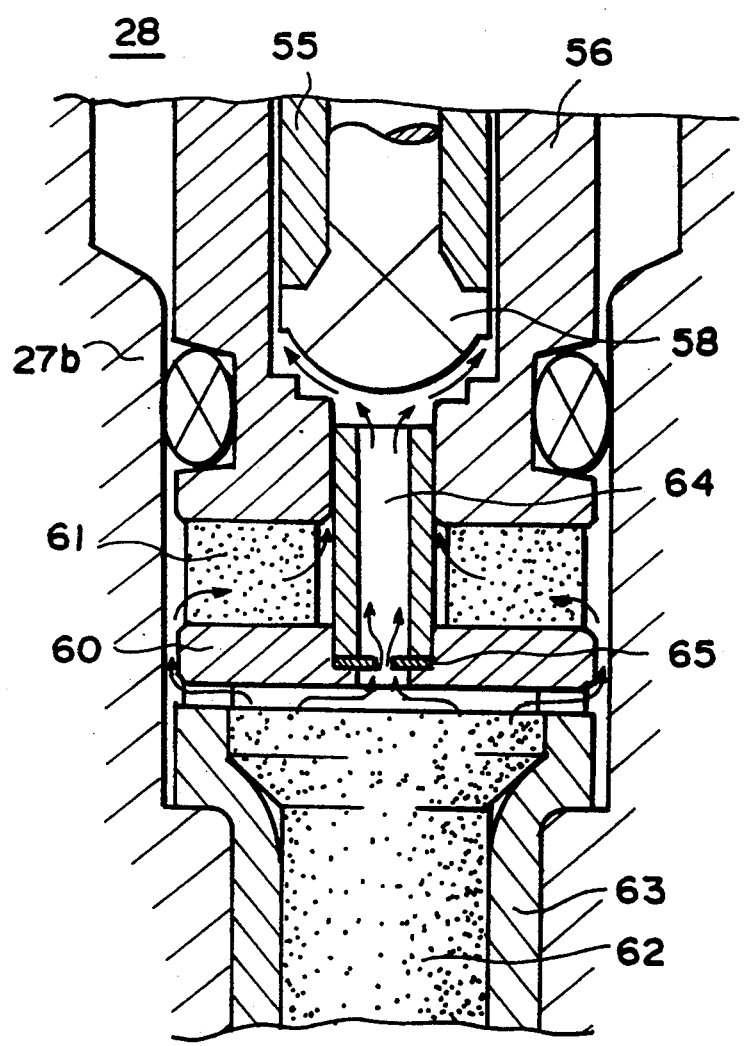
FIG. 20 is an enlarged view of the valve mechanism shown in FIG. 19.

FIGS. 19 and 20 illustrate detailed structures of the valve mechanism 28 for supplying fuel gas from the fuel tank 27 to the burner 16 while the fuel gas is vaporized on its way to the burner. In the upper part 27b of the fuel tank 27, a nozzle 54 housed in a fastening ring 57 together with a nozzle bottom 56 is positioned. A nozzle valve rubber 58 is fixedly fitted into the lower end of the nozzle, and the nozzle is thrust by a spring 59 so that the nozzle valve rubber 58 can close an opening formed in the bottom of the nozzle bottom 56. A microporous filter 61 is sandwiched between the nozzle bottom 56 and a nail-shaped stationary part 60, and there are also provided a core 62 and a core holder 63. A main flow channel 64 is formed at the center of a shaft of the nail-shaped stationary part 60 so that it can pass through the stationary part. A flow rate regulating plate 65 with a central orifice is disposed in the flow channel 64. A sub-stream flows through the microporous filter 61 from its outer periphery to its center, and flows to surround the shaft portion of the nail-shaped stationary part 60.

When the nozzle 55 is opened, fuel gas flowing out of the core 62 is divided into a main stream, going along the main flow channel 64 which passes through the center of the nail-shaped stationary part 60, and a sub-stream going through the microporous filter 61. Thereafter, both streams of fuel gas enter the nozzle bottom 56. At this time, the extent of the main stream is regulated by the flow rate regulating plate 65, whilst the extent of the sub-stream is automatically regulated by the microporous filter 61 in accordance with ambient temperature. The above-mentioned microporous filter 61 includes open cells which constitute the gas flow channel and closed cells which cause expansion or contraction in accordance with temperature variations, so that the gas flow channel expands or contracts.

In order to correct variations in gas flow rate caused by variations in internal gas pressure of the fuel tank 27 in accordance with ambient temperature by means of a simple structure without a gas pressure regulating valve mechanism, flow regulating operations by the foregoing microporous filter 61 are utilized. However, a considerable amount of gas flows through this microporous filter 61, and the filter 61 is cooled by a latent heat of the gas when it evaporates, which causes flow rate regulating operations in accordance with aforesaid temperature variations to drop. In view of this, the gas flow is divided into the main stream and the sub-stream so that the amount of gas flowing through the microporous filter 61 can be decreased, thereby assuring a regulating function of the filter.

Figure 23:
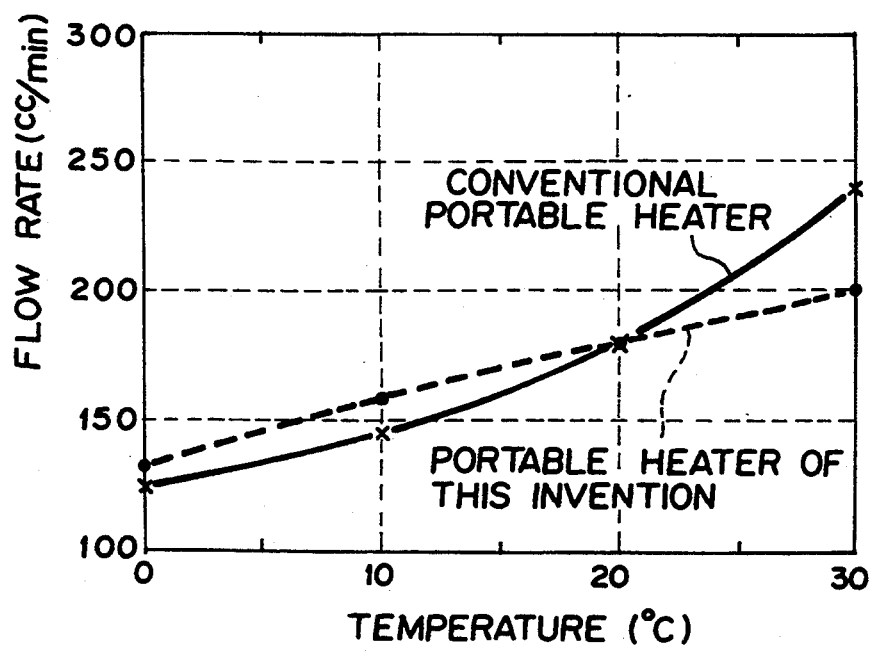
FIG. 23 is a graph showing variations in gas flow rate with respect to temperature when the valve mechanism is provided with a microporous filter.

FIG. 23 illustrates measured results of gas flow characteristics relative to temperature variations between a heater of this invention equipped with a flow rate regulating mechanism having the above-described microporous filter 61 and a conventional heater without a flow rate regulating mechanism. The conventional heater designated with a solid line shows an upsurge of the gas flow rate in accordance with an increase of temperature, whereas a heater of this invention designated by a dotted line shows a moderate linear increase of the gas flow rate in accordance with an increase of temperature.

Heating action of the heater according to this embodiment will now be described. When the heater is not in use, the opening member 21 engaging the pull-tab 15 is flattened against the upper surface of the container 14, and the tip end 18a of the operation rod 18 is also flattened and housed. In this fire extinguishing state, the ignition lever 33 is situated at an upper position, and the bimetal member 41 remains in a non-deformed state. The hook 42 is located at a position which permits the ignition lever 33 to vertically move. In order to heat the container 14 remaining in a stored state by igniting the burner 16, the opening member 21 is slid toward the operation rod 18, and then pulled up. This causes the pull-tab 15 to be removed, so that the container 14 is opened, and also causes the tip end 18a of the operation rod 18 to be released, so that it stands upright.

After the container 14 is opened, returning the opening member 21 to a horizontal state causes the operation rod 18 to be forced downwards. In accordance with this downward thrust of the operation rod, ignition operations involving the depression of the ignition lever are carried out. Thereby, gas released from the burner 16 is ignited. Immediately after the combustion starts, the bimetal member 41 still remains cool and non-deformed, and hence the hook 42 is situated in a receded position. The ignition confirmation member 22 also remains cool, and its color remains unchanged or undeveloped.

After predetermined periods have passed from the start of combustion while the ignition lever 33 is kept depressed, the bimetal member 41 becomes deformed upon receipt of combustion heat through the heat-sensitive part 43. As shown in FIG. 17 (B), the hook 42 is pivoted to come into contact with the top of the ignition lever 33, whereupon the ignition lever 33 cannot return to its elevated position even when a hand is released from the operation rod 18. This causes the emission of gas from the burner 16 to be maintained, and hence the combustion continues.

In the operating procedures of the safety device 30 which prepares for unforeseeable extinguishing of flames, combustion gas from the burner 16 flows upwardly through a gap between the outer case 12 and the container 14, so that the outer case 12 is heated through the partition member 13. The temperature of the outer case 12 increases in accordance with the elapse of time from the ignition of the burner 16. When the temperature reaches a predetermined level, the ignition confirmation member 22 changes or develops its color. The heat-sensitive characteristics of the ignition confirmation member are set associated with operations of the safety device 30, and the ignition lever 33 remains locked in a combustion state when the ignition confirmation member changes or develops its color. Thus, it is possible to confirm both the ignition of the burner 16 and the condition of flames. Combustion is maintained by releasing the opening member 21 from its igniting operations after the change or development in color of the ignition confirmation member 22 are confirmed. When the outer case 12 becomes too hot to touch the outer case 12 with bare hands after the combustion has lasted for a certain period, the high temperature warning member 23 changes or develops its color to issue a caution.

When flames unexpectedly go out under the influence of wind or by spilt liquid contents during the combustion, the hook 42 recedes in accordance with a temperature drop of the bimetal member 41, and then the hook 42 comes out of contact with the ignition lever 33. The ignition lever 33 returns upwards, and hence a gas supply to the burner 16 is stopped, thereby preventing the emission of gas without flames. In order to extinguish fire, the operation rod 18 that has been pulled out from the ignition position is inserted into a fire extinguishing position corresponding to the engaging portion 46a of the fire extinguishing lever 46. Depression of the fire extinguishing lever 46 causes the hook 42 to be forcibly disengaged from the ignition lever 33, and the ignition lever 33 returns to its original position, thereby extinguishing the flames of the burner.

During the heating of the container 14, since the lower end of the partition member 13 extends further downwards below the bottom 14a of the container, hot air produced by flames of the burner 16 rise only along channels for the updraft of gas constituted by inner spacing between inner troughs of the partition member 13 and the outer wall surface of the container 14, whereby the container 14 can be efficiently heated, and a temperature increase of the outer case 12 is suppressed.

THIRD EMBODIMENT

Figure 24:
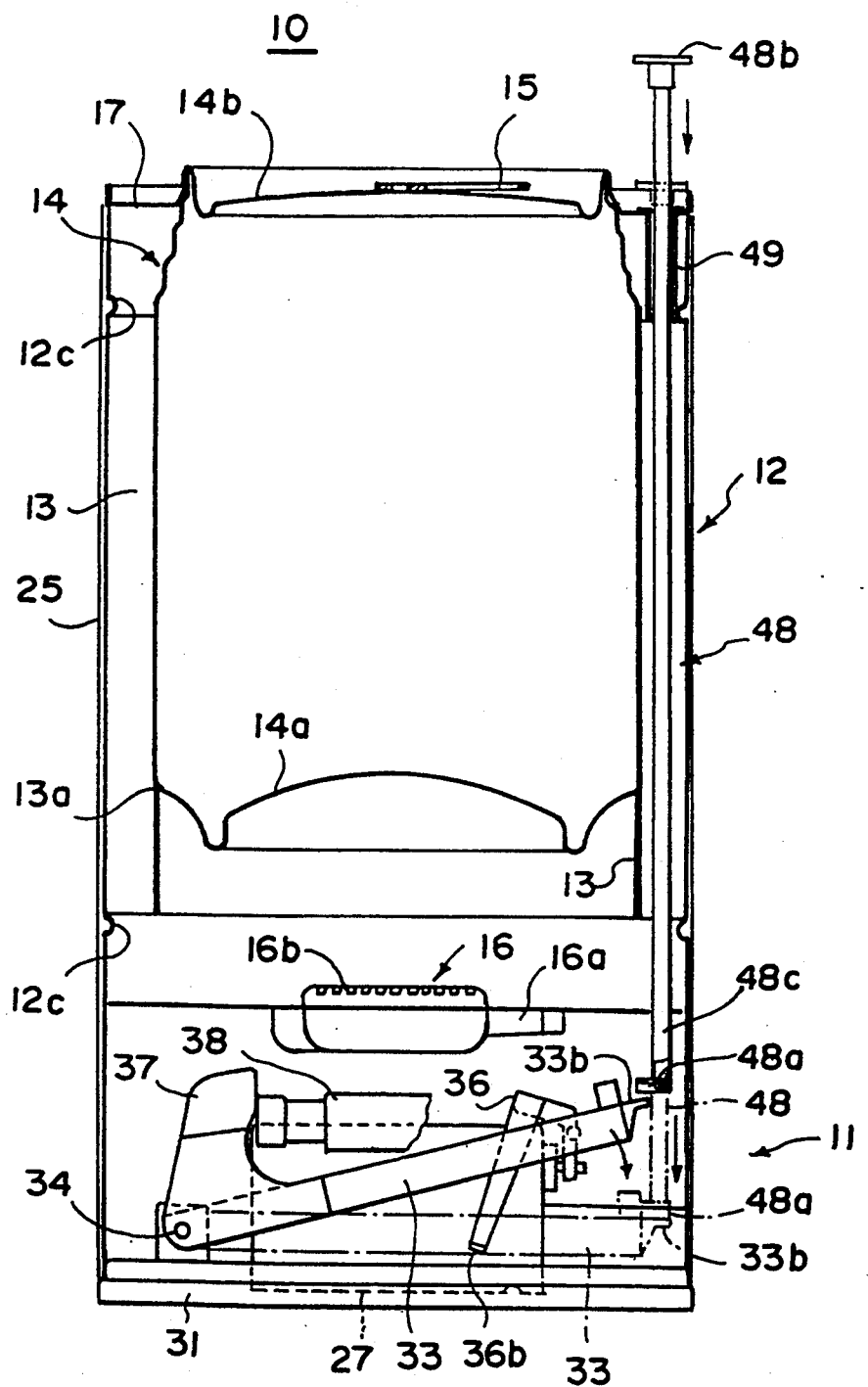
FIG. 24 is a cross sectional side view of a portable heater according to a third embodiment of this invention.
Figure 25:
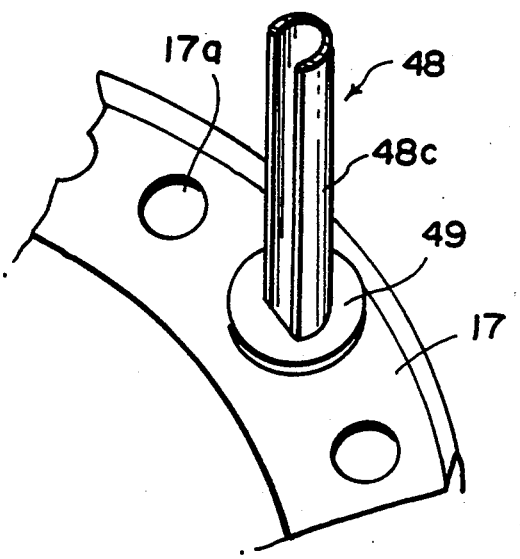
FIG. 25 is a perspective view of an insertion part for the operation rod shown in FIG. 24.
Figure 26A:
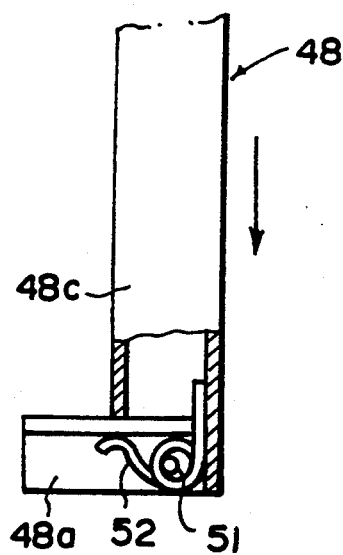
FIGS. 26 (A) and (B) are cross sectional views of the tip end of the operation rod shown in FIG. 24.
Figure 26B:
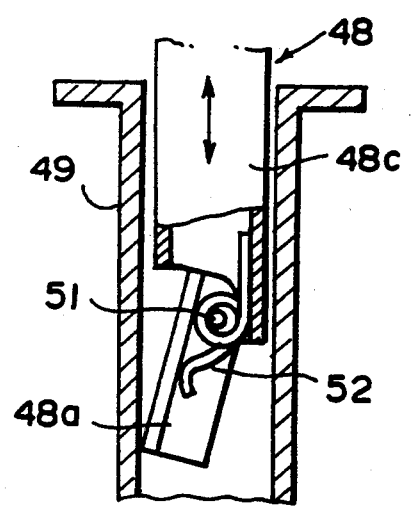

FIGS. 24 through 26 illustrate modified examples of the operation rod. Other features of these examples are basically similar to the previous examples.

An operation rod 48 according to this embodiment is composed of a rod portion 48c extending along the outer case 12; a laterally angled engaging tip 48a provided at the lower end of the rod portion for engaging the engaging portion 33b of the ignition lever 33; and a push portion 48b provided at the upper end of the operation rod for depressing the rod. Differing from the preceding embodiments, the operation rod 48 of this embodiment is not arranged to be linked with the opening member 21.

This operation rod 48 is removable from the outer case 12, and a guide sleeve 49 is provided in an upper part of the outer case 12 for directing an inserted rod from the exhaust plate 17 to the partition plate 13. The engaging tip 48a is formed in a pivotable fashion in accordance with insertion of this operation rod 48. In effect, as shown in FIG. 26 (A), the engaging tip 48a is pivotably supported by a pin 51 on the lower end of the rod portion 48c of the operation rod 48, and is forced by a spring 52 at right angles to the rod. At this angled position, the upper edge of the engaging tip abuts against the rod portion 48c.

The above-described rod portion 48c of the operation rod 48 is a cylindrical shape, but may be formed into a partially-cut cylinder as shown in FIG. 25 in order to regulate the orientation of the extended engaging tip 48a to the engaging portion 33b of the ignition lever 33, and a guide hole of the guide sleeve 49 is formed to correspond to the shape of the rod portion.

In order to insert the foregoing operation rod 48, the operation rod is inserted into the guide hole of the guide sleeve 49 while the engaging tip 48a is extended in the direction of the rod portion 48c against the force of the spring 52 as shown in FIG. 26 (B). When the engaging tip goes further below the lower end of the partition plate 13, the engaging tip 48a is angled, as shown in FIG. 26 (A), and becomes engageable with the engaging portion 33b of the ignition lever 33. Depression of the pushing portion 48b on the upper end of the rod causes the ignition lever 33 to be pivotally moved, thereby carrying out ignition operations. In order to pull up the operation rod 48, uplift of the rod portion 48c causes the upper edge of the engaging tip 48a to abut against the lower end of the partition plate 13. Eventually, the engaging tip 48a is downwardly pivoted, and the rod is pulled out with its engaging tip extended through the sleeve 49 as shown in FIG. 26 (B).

Since the operation rod 48 is removable, this rod can be inserted into a location differing from the above mentioned position so that it can actuate the fire extinguishing button, and carry out extinguishing operations.

FOURTH EMBODIMENT

Figure 27:
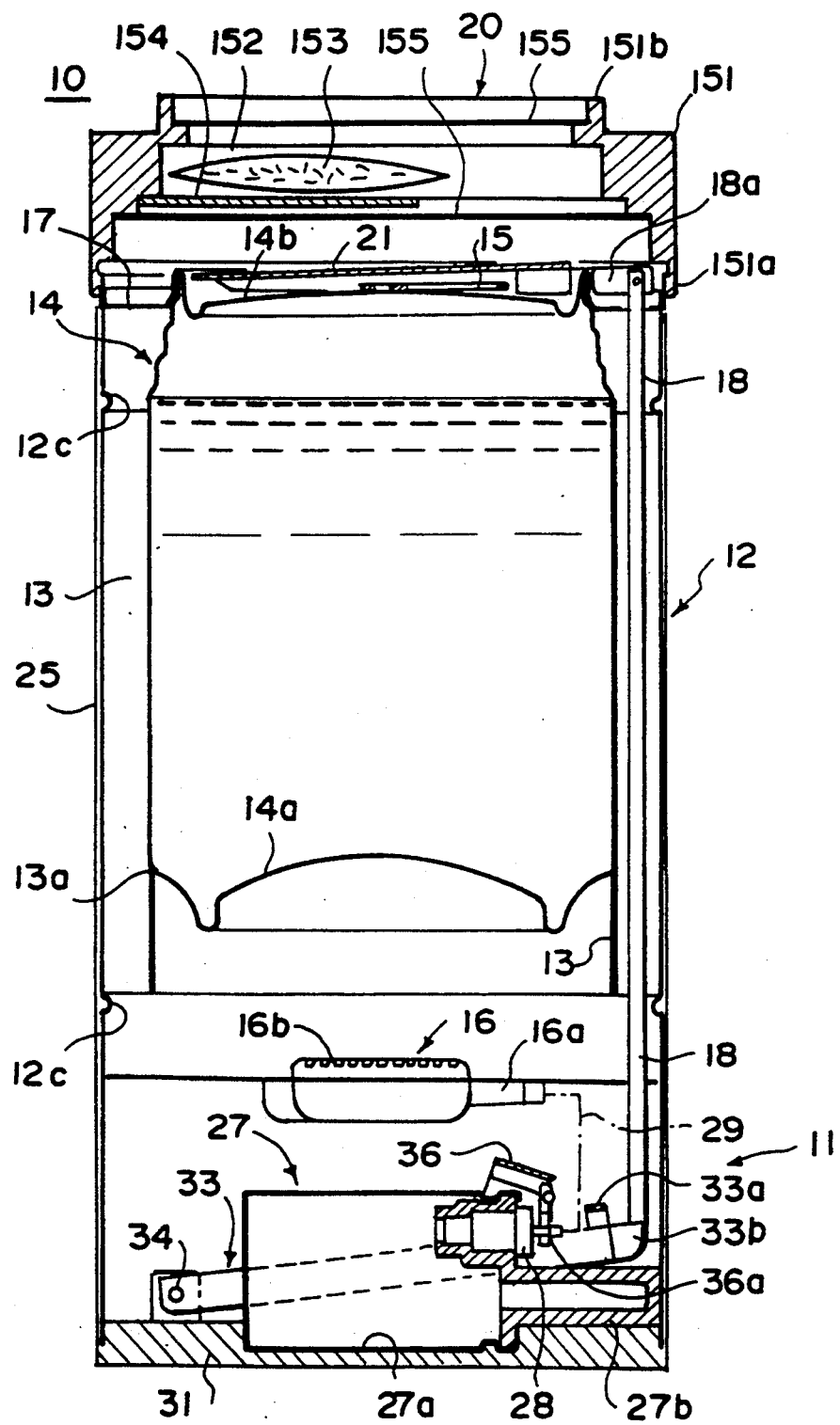
FIG. 27 is a longitudinal cross sectional view showing a principal structure of a portable heater provided with an outlet structure according to a fourth embodiment of this invention.
Figure 28:
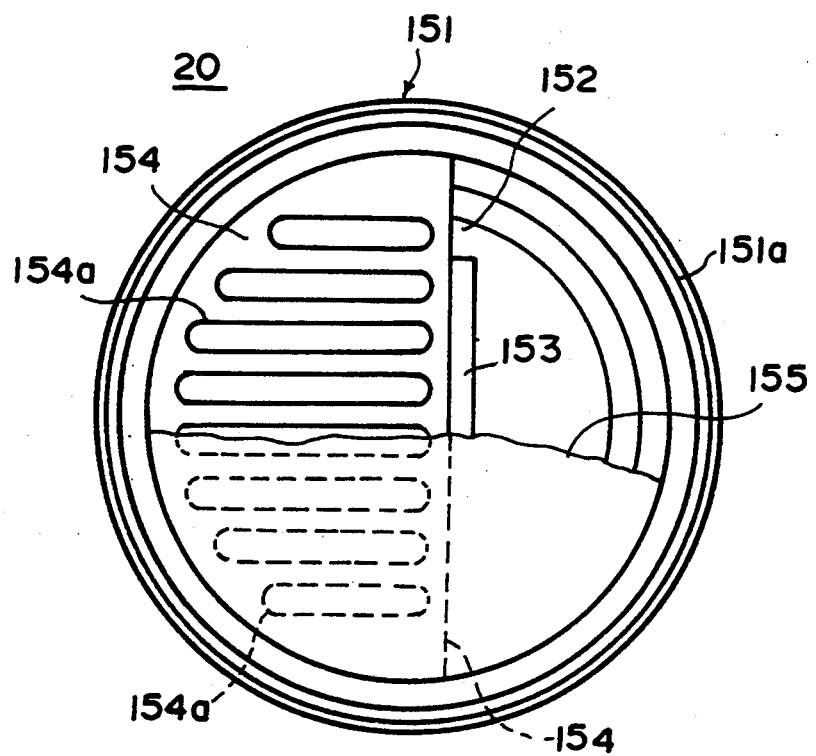
FIG. 28 is a plan view of the outlet member shown in FIG. 27.

As shown in FIG. 27 to 29, this embodiment is an example of a portable heater equipped with an outlet structure.

The principal structure of the portable heater 10 is similar to the heater of the second embodiment. This heater is provided with the cylindrical outer case 12, the container to be heated 14, the burner 16, and the ignition means 11. As shown in FIG. 27, when the heater is not in use, an outlet member 20 is disposed on the top of the container 14 while being attached to the outer case 12. This outlet member 20 is removed from the outer case 12 when the heater is heated.

A detailed structure of the outlet member 20 will now be described with reference to FIGS. 27 and 28. A ring-shaped main body 151 of the outlet member 20 has the same outer diameter as the outer case 12, and has a first ring-shaped fitting portion 151a which is formed along the outer edge on one side (an under surface shown in FIG. 27) of the main body. The first fitting portion 151a can be fitted to the upper end outer periphery of the outer case 12. This keeps the outlet member 20 attached to the main body of the heater 10 before the heater is heated, i.e., in a stored state. A second ring-shaped fitting portion 151b extended upwardly is formed to the inside of the outer periphery on the opposite surface (an upper surface shown in FIG. 27) of the main body 151. The second fitting portion 151b can be fitted to the upper outer periphery of the container 14. This keeps the outlet member 20 attached to the container 14 when the heater is in use, whereby liquid contents are poured through the outlet member 20.

A holding part 152 is constituted by stepped spacing in the middle of the main body 151 of the outlet member 20, and this holding part 152 stores a beverage material 153 such as a tea bag containing tea leaves. A stopper part 154 for obstructing flow of the beverage material 153 is formed on one side of the holding part 152 which is closer to the first fitting portion 151a. The stopper part 154 is made of a substantially semicircular plate member. Slit openings 154a are formed on this stopper part 154 so that liquid contents can flow through the slits. Sealing foil 155 is detachably adhered to stepped circumferences on both sides of the upper and lower surfaces of the housing part 152, and the sealing foil 155 keeps the holding part 152 hermetically covered.

The operation of this outlet member of this embodiment will now be described. When the heater is not in use, i.e., in a stored state, the first fitting portion 151a of the outlet member 20 is fitted to the top of the outer case 15, and the heater 10 is carried around and stored. In this state, the beverage material 153 held in the holding part 152 of the outlet member 20 is hermetically preserved while being maintained in an appropriate condition by the sealing foil 155.

To heat the container 14 by starting combustion of the burner 16, the outlet member 20 is first removed from the outer case 12, and the push of the operation lever 18 using the opening member 21 effects ignition operations which involve the depression of the ignition lever 33.

When the heating of the container is completed, as shown in FIG. 29, the opening member 21 is removed from the pull-tab 15, and the operation rod 18 is pulled out. If necessary, the pull-tab 15 is removed, so that the opening of the container is increased. In this state, the sealing foil 155 is detached from the outlet member 20 so that liquid contents can flow, whereupon the beverage material 153 is exposed. Thereafter, the second fitting portion 151b is fitted to the container 14, and hence the outlet member 20 is attached to the heater. At this time, the opening of the container 14 is aligned with the block part 154, and the container 14 is tipped together with the outer case 12, so that internal liquid contents (hot water) are poured into the outlet member 20 through the opening of the container. Constituents of the beverage material 153, that is, tea leaves in the tea bag are extracted when the beverage material comes into contact with hot water. The block part 154 prevents the beverage material 153 from falling off.

In this embodiment, although the block part 154 of the outlet member 20 is constituted of a plate member having slit openings 154, this part may be made up of any other nets or meshed members. This block part 154 may be provided over the whole of the holding part 152, or may be provided on both sides of the holding part. Meanwhile, although a tea bag having tea leaves contained in a permeable bag is used as the beverage material 153 in the foregoing embodiment, the block part 154 may be formed of a meshed member, and beverage materials such as tea leaves may be directly held in the holding part 152 of the outlet member 20.

In the foregoing embodiment, the first fitting portion 151a which is fitted to the top of the outer case 12 is formed on one side of the outlet member 20, and the second fitting portion 151b which is attachable to the top of the container 14 is formed on the other side of the outlet member 20. This outlet member is inverted between when the heater is not in use and when the heater is in use. Unless ignition operation members or others connected to the opening member 20 are disposed on the tops of the container 14 and outer case 12, a fitting part which is attachable to the top of the container 14 may be formed on only one side of the outlet member. In a stored state, the outlet member 20 and the heater main body may be integrally packaged in a heat-shrinkable film.

Several embodiments of the invention have now been described in detail. It is to be noted, however, that these descriptions of specific embodiments are merely illustrative of the principles underlying the inventive concept. It is contemplated that various modifications of the disclosed embodiments, as well as other embodiments of the invention will, without departing from the spirit and scope of the invention, be apparent to persons skilled in the art.

We claim:

1. A portable heater comprising: a cylindrical outer case with at least one end thereof open; a container to be heated, for containing contents to be heated when said heater is in use, fixedly housed in said outer case with a gap between the container and said outer case for the updraft of a combustion gas, the container being made of a cylindrical heat resisting container body having a top provided with an opening tab; heat insulating means disposed in the gap between the container and the outer case providing passages for the updraft of combustion gas to flow adjacent to the container; a burner which is equipped with an ignition means, and is fixedly housed in said outer case at a lower inside thereof so as to heat said container; a fuel tank fixed in a lower inside of said outer case; and vent holes formed on said outer case for supplying air from the outside to said burner.

2. A portable heater as defined in claim 1, wherein said outer case is made of a metal laminate, and the heat insulating means comprises a heat insulating material provided on at least the interior surface of said outer case.

3. A portable heater as defined in claim 2, wherein a heat insulating expanded material member is provided on the exterior surface of said outer case.

4. A portable heater as defined in claim 1, wherein the top of said outer case is covered with a vessel for holding the contents of said container after heating.

5. A portable heater as defined in claim 1, wherein said ignition means of said burner is a piezoelectric type automatic ignition device.

6. A portable heater as defined in claim 1, wherein at least a part of said fuel tank is made of a transparent material so that a quantity of remaining fuel is visible from the outside, and a window is formed at a location on said outer case corresponding to said transparent part of said fuel tank so that the remaining fuel can be checked.

7. A portable heater as defined in claim 1, wherein first vent holes are formed at a location on said outer case which is lower than said burner, and a second vent port is formed at a location on said outer case which is higher than said burner.

8. A portable heater as defined in claim 1, wherein a heat transfer metal plate is arranged with one end thereof wrapped around the outer periphery of said fuel tank and the other end thereof remaining in contact with the bottom of said burner.

9. A portable heater as defined in claim 1, wherein the heat insulating means comprises a crimped partition member interposed between said outer case and said container to be heated, and said partition member is made of a crimped member which is inserted into said outer case while being warped, and is held against said outer case under the recovery force of said crimped member.

10. A portable heater as defined in claim 1, wherein a single faced crimped board is wrapped around the outer periphery of said outer case with a liner of said crimped board facing outwards.

11. A portable heater comprising: a cylindrical outer case with at least one end thereof open; a container to be heated, for containing contents to be heated when said heater is in use, fixedly housed in said outer case with a gap between the container and said outer case for the updraft of a combustion gas, the container being made of a cylindrical heat resisting container body having a top provided with an opening tab; a burner which is equipped with an ignition means, and is fixedly housed in said outer case at a lower inside thereof so as to heat said container; a fuel tank fixed in a lower inside of said outer case; and vent holes formed on said outer case for supplying air from the outside to said burner, wherein said container is provided with a means for automatically boring a discharge hole in said main body of said container for expelling steam when a pressure inside said main body exceeds a predetermined level.

12. A portable heater comprising: a cylindrical outer case with at least one end thereof open; a container to be heated, for containing contents to be heated when said heater is in use, fixedly housed in said outer case with a gap between the container and said outer case for the updraft of a combustion gas, the container being made of a cylindrical heat resisting container body having a top provided with an opening tab; a burner which is equipped with an ignition means, and is fixedly housed in said outer case at a lower inside thereof so as to heat said container; a fuel tank fixed in a lower inside of said outer case; and vent holes formed on said outer case for supplying air from the outside to said burner, wherein said container is provided with a means for automatically boring a discharge hole in said main body of said container for expelling steam when a temperature inside said main body exceeds a predetermined level.

13. A portable heater comprising: a cylindrical outer case with at least one end thereof open; a container to be heated, for containing contents to be heated when said heater is in use, fixedly housed in said outer case with a gap between the container and said outer case for the updraft of a combustion gas, the container being made of a cylindrical heat resisting container body having a top provided with an opening tab; a burner which is equipped with an ignition means, and is fixedly housed in said outer case at a lower inside thereof so as to heat said container; a fuel tank fixed in a lower inside of said outer case; and vent holes formed on said outer case for supplying air from the outside to said burner, wherein first vent holes are formed at a location on said outer case which is lower than said burner, and a second vent port is formed at a location on said outer case which is higher than said burner, and wherein a baffle plate having small holes is provided to the inside of said second vent port.

14. A portable heater as defined in claim 13, wherein said baffle plate is formed by separating the upper and lower sides of said second vent port, and by convexly pressing the separated part of said vent port into said outer case when said second vent port is opened by pressing said outer case.

15. A portable heater comprising: a cylindrical outer case with at least one end thereof open; a container to be heated, for containing contents to be heated when said heater is in use, fixedly housed in said outer case with a gap between the container and said outer case for the updraft of a combustion gas, the container being made of a cylindrical heat resisting container body having a top provided with an opening tab; a burner which is equipped with an ignition means, and is fixedly housed in said outer case at a lower inside thereof so as to heat said container; a fuel tank fixed in a lower inside of said outer case; and vent holes formed on said outer case for supplying air from the outside to said burner, wherein a gas flow channel flowing from said fuel tank to said burner is divided into two streams: a main stream passing through the center of a nail-shaped stationary part, and a sub-stream passing from the circumference to the center through a disk-like filter with a center hole which surrounds said stationary part, and said filter includes open cells which constitute the gas flow channel and closed cells which expand and contract in accordance with variations in temperature, and said filter is made up of a microporous filter for automatically regulating a gas flow rate.

16. A portable heater comprising: a cylindrical outer case with at least one end thereof open; a container to be heated, for containing contents to be heated when said heater is in use, fixedly housed in said outer case with a gap between the container and said outer case for the updraft of a combustion gas, the container being made of a cylindrical heat resisting container body having a top provided with an opening tab; a burner which is equipped with an ignition means, and is fixedly housed in said outer case at a lower inside thereof so as to heat said container; a fuel tank fixed in a lower inside of said outer case; and vent holes formed on said outer case for supplying air from the outside to said burner, wherein said heat insulating means comprises a crimped partition member having an engaging part constituted by the inwardly flattened end of said partition member which is positioned on the interior surface of said outer case; and further comprising a disk-shaped exhaust plate having a plurality of exhaust holes disposed with the outer periphery thereof engaging with the upper end of said outer case and with the inner edge thereof upwardly extended; the extended portion of said exhaust plate being pressed against the upper brim of said container; and the lower brim of said container being in contact with said engaging part of said partition member, so that said container to be heated is held.

17. A portable heater as defined in claim 16, wherein inwardly raised engaging sections are formed on said outer case in the vicinity of the upper and lower edges of said partition member disposed on the interior surface of said outer case, and said partition member is held between said raised engaging sections.

18. A portable heater having a burner positioned at the bottom of an outer case, a container to be heated disposed in an upper part of said outer case, a fuel tank for storing fuel gas to be supplied to said burner, and an ignition means positioned in proximity to said burner for emitting gas from said burner and igniting the emitted gas, the improvement further comprising an operation rod upwardly extending along and within the periphery of said outer case with the lower end thereof coupled to said ignition means and the upper end thereof extending farther upwards from said outer case, whereby said ignition means is actuated upon depression of said operation rod, so that said burner catches fire.

19. A portable heater as defined in claim 18, wherein said operation rod is provided so as to be removable from said outer case by upwardly drawing out said rod.

20. A portable heater having a burner located at the bottom of an outer case, a container to be heated, at the upper surface of which an opening pull tab is provided, for containing liquid such as water with a hermetic seal, said container being positioned in an upper part of said outer case; and an ignition means for carrying out the igniting operation of said burner, and wherein after said container is heated with said pull tab opened, liquid contents are poured through an outlet member attached to the upper part of said container, the improvement is characterized in that at least one side of said outlet member is attachable to the upper part of said container; beverage materials such as tea leaves are kept in a holding section formed in the middle of said outlet member; a block part is formed on at least one side of said holding section to prevent flow of the beverage materials from said holding section; and both surfaces of said holding section are detachably covered with sealing foil.

21. A portable heater as defined in claim 20, wherein one surface of said outlet member is attachable to the top of said container to be heated; the other surface of said outlet member is attachable to the top of said outer case; and said block part is formed on the side of said holding section that is attachable to the top of said outer case.

* * * * *